United States Patent
Suzuki

(10) Patent No.: US 12,149,855 B2
(45) Date of Patent: Nov. 19, 2024

(54) LIGHT RECEIVING DEVICE, ELECTRONIC APPARATUS, AND LIGHT RECEIVING METHOD TO REDUCE A LOAD CURRENT IN A PROCESSING CIRCUIT

(71) Applicant: SONY SEMICONDUCTOR SOLUTIONS CORPORATION, Kanagawa (JP)

(72) Inventor: Nobuharu Suzuki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/767,694

(22) PCT Filed: Oct. 5, 2020

(86) PCT No.: PCT/JP2020/037702
§ 371 (c)(1),
(2) Date: Apr. 8, 2022

(87) PCT Pub. No.: WO2021/075292
PCT Pub. Date: Apr. 22, 2021

(65) Prior Publication Data
US 2024/0121536 A1    Apr. 11, 2024

(30) Foreign Application Priority Data
Oct. 18, 2019   (JP) ................................ 2019-191449

(51) Int. Cl.
H04N 25/78         (2023.01)
(52) U.S. Cl.
CPC ................... H04N 25/78 (2023.01)

(58) Field of Classification Search
CPC ..................................................... H04N 25/78
See application file for complete search history.

(56) References Cited

U.S. PATENT DOCUMENTS

| | | | |
|---|---|---|---|
| 11,265,497 B2* | 3/2022 | Kondou | H04N 25/772 |
| 2014/0160334 A1* | 6/2014 | Wakabayashi | H04N 25/78 |
| | | | 348/308 |

(Continued)

FOREIGN PATENT DOCUMENTS

| | | |
|---|---|---|
| CN | 104429057 A | 3/2015 |
| CN | 109691079 A | 4/2019 |

(Continued)

OTHER PUBLICATIONS

International Search Report and Written Opinion of PCT Application No. PCT/JP2020/037702, issued on Dec. 22, 2020, 11 pages of ISRWO.

*Primary Examiner* — Gevell V Selby
(74) *Attorney, Agent, or Firm* — CHIP LAW GROUP

(57) ABSTRACT

An increase in a load current in a processing circuit is reduced. A light receiving device includes an imaging unit that photoelectrically converts light received in a plurality of pixels to acquire an analog image signal, a conversion unit that converts the analog image signal acquired by the imaging unit into digital image data, and a data processing unit that executes data processing on the digital image data and reduces a load of the data processing in a period in which the conversion unit executes conversion as compared to a period in which the conversion unit does not execute conversion.

18 Claims, 17 Drawing Sheets

(56) References Cited

U.S. PATENT DOCUMENTS

| | | |
|---|---|---|
| 2015/0163403 A1 | 6/2015 | Wakabayashi |
| 2018/0084213 A1* | 3/2018 | Kim .................... H04N 25/616 |
| 2019/0204448 A1 | 7/2019 | Eki |
| 2020/0260034 A1* | 8/2020 | Moue .................... H04N 25/75 |
| 2021/0306577 A1* | 9/2021 | Shigiya .................. H04N 25/46 |

FOREIGN PATENT DOCUMENTS

| | | |
|---|---|---|
| EP | 2871835 A1 | 5/2015 |
| EP | 3515057 A1 | 7/2019 |
| JP | 2018-195975 A | 12/2018 |
| KR | 10-2015-0035722 A | 4/2015 |
| KR | 10-2019-0051968 A | 5/2019 |
| KR | 10-2020-0006971 A | 1/2020 |
| WO | 2014/007004 A1 | 1/2014 |
| WO | 2018/051809 A1 | 3/2018 |
| WO | 2018/211974 A1 | 11/2018 |
| WO | 2018/211986 A1 | 11/2018 |

\* cited by examiner

LIGHT RECEIVING DEVICE, ELECTRONIC APPARATUS, AND LIGHT RECEIVING METHOD TO REDUCE A LOAD CURRENT IN A PROCESSING CIRCUIT

CROSS REFERENCE TO RELATED APPLICATIONS

This application is a U.S. National Phase of International Patent Application No. PCT/JP2020/037702 filed on Oct. 5, 2020, which claims priority benefit of Japanese Patent Application No. JP 2019-191449 filed in the Japan Patent Office on Oct. 18, 2019. Each of the above-referenced applications is hereby incorporated herein by reference in its entirety.

TECHNICAL FIELD

The present disclosure relates to a light receiving device, an electronic apparatus, and a light receiving method.

BACKGROUND ART

In recent years, it has been required to perform various signal processing on image data captured by an image sensor at a high speed. In addition, with the improvement of semiconductor process technology, a semiconductor device in which a plurality of chips such as an image sensor chips, a memory chip, and a signal processing chip are connected through bumps and packaged, and a semiconductor device in which a die on which an image sensor is disposed and a die on which a memory, a signal processing circuit, and the like are disposed are laminated and packaged have been proposed.

CITATION LIST

Patent Literature

[PTL 1]
WO 2018/051809 A1

SUMMARY

Technical Problem

In an image sensor having such a digital circuit, it is highly possible that current fluctuation will occur due to change over time of a signal processing load. This current fluctuation causes noise to be mixed into a pixel readout circuit including analog-to-digital (A/D) conversion. As a result, a problem that noise is added to an output pixel value occurs. In particular, in an image sensor including a digital signal processor (DSP) or a complicated signal processing circuit, such as a sensor equipped with AI, a processing load significantly fluctuates in each processing sequence, and thus the influence on pixel values becomes more significant.

Therefore, the present disclosure provides a light receiving device, an electronic apparatus, and a light receiving method for reducing a load current increase in a processing circuit.

Solution to Problem

According to an embodiment, a light receiving device includes an imaging unit that photoelectrically converts light received in a plurality of pixels to acquire an analog image signal, a conversion unit that converts the analog image signal acquired by the imaging unit into digital image data, and a data processing unit that executes data processing on the digital image data, and reduces a load of the data processing in a period in which the conversion unit executes conversion as compared to a period in which the conversion unit does not execute conversion.

The light receiving device may further include a clock generation unit that generates a clock signal having a predetermined frequency, and a clock control unit that receives the clock signal having the predetermined frequency from the clock generation unit, outputs the clock signal having the predetermined frequency to the data processing unit in a period in which the conversion unit does not execute conversion processing, and outputs a clock signal controlled to have a frequency lower than the predetermined frequency to the data processing unit in a period in which the conversion unit executes conversion processing, wherein the data processing unit may execute data processing on the basis of the clock signal output by the clock control unit. In this manner, the load current may be reduced by controlling the clock frequency of the data processing unit.

The light receiving device may further includes an imaging control unit that controls a timing at which the imaging unit performs imaging, and a period designation unit that designates a period in which the load of data processing will be reduced on the basis of the timing controlled by the imaging control unit. In this manner, the clock frequency of the data processing unit may be controlled on the basis of a synchronization signal used for imaging control.

The clock control unit may control the clock signal to have a frequency lower than the predetermined frequency in the period designated by the period designation unit. In this manner, the clock control unit may control the clock frequency to be low in the designated period.

The imaging control unit may output a synchronization signal to the period designation unit at an imaging timing, and the period designation unit may designate a period in which the clock control unit controls the clock signal to be lower than the predetermined frequency on the basis of the synchronization signal.

The imaging control unit may output a first synchronization signal that is a synchronization signal for an imaging timing of an image to be imaged in a first direction and a second synchronization signal that is a synchronization signal for an imaging timing of the image to be imaged in a second direction intersecting the first direction to the period designation unit. For example, the imaging control unit may output a vertical synchronization signal (Vsync) and a horizontal synchronization signal (Hsync) to the period designation unit with respect to the pixel array included in the imaging unit.

The period designation unit may designate a first predetermined period based on the first synchronization signal as a period in which the clock control unit outputs the clock signal having the predetermined frequency, and the clock control unit may output the clock signal having the predetermined frequency generated by the clock generation unit in the first predetermined period on the basis of output of the period designation unit. In this manner, the period designation unit may designate a period in which the clock signal having the predetermined clock frequency is output on the basis of the signal Vsync.

The period designation unit may designate a second predetermined period based on the second synchronization signal as a period in which the clock control unit outputs a clock signal having a frequency lower than the predetermined frequency, and the clock control unit may control the clock signal generated by the clock generation unit to be a clock signal having a frequency lower than the predetermined frequency and output the clock signal in the second predetermined period on the basis of output of the period designation unit. In this manner, the period designation unit may designate a period in which control for outputting a clock signal having a clock frequency lower than the predetermined frequency is performed on the basis of signal Hsync.

The clock control unit may perform control such that a clock signal is not output in a period in which the conversion unit executes conversion. In this manner, the clock control unit may not perform control such that a clock signal is not output in the period in which the conversion unit executes data conversion. In addition, control may be performed such that a clock signal is not output in periods including periods before and after the conversion unit executes conversion as margins.

The data processing unit may include an image processing unit that executes image processing of the digital image data on the basis of the clock signal output by the clock control unit.

The data processing unit may include a signal processing unit that executes processing by a trained neural network model. In this manner, the data processing unit may include processing units that respectively execute a plurality of kinds of processing.

The imaging unit, the conversion unit, and the data processing unit may be formed on the same substrate. In this manner, the light receiving device may be formed as a semiconductor device in which each of the aforementioned components is formed on one substrate.

The light receiving device may include a first substrate on which the imaging unit is formed, and a second substrate on which the conversion unit and the data processing unit are formed, which is laminated on the first substrate. In this manner, the light receiving device may be formed as a laminated type semiconductor device.

The first substrate and the second substrate may be bonded by any of a Chip on Chip (CoC) method, a Chip on Wafer (CoW) method, and a Wafer on Wafer (WoW) method. In this manner, a laminating method may be appropriately selected.

According to an embodiment, an electronic apparatus includes a light receiving device that outputs captured image data, and a processor that performs predetermined signal processing on the image data, wherein the light receiving device includes an imaging unit that photoelectrically converts light received in a plurality of pixels to acquire an analog image signal, a conversion unit that converts the analog image signal acquired by the imaging unit into digital image data, a clock generation unit that generates a clock signal having a predetermined frequency, a clock control unit that receives the clock signal having the predetermined frequency from the clock generation unit, outputs the clock signal having the predetermined frequency to the data processing unit in a period in which the conversion unit does not execute conversion processing, and outputs a clock signal controlled to have a frequency lower than the predetermined frequency to the data processing unit in a period in which the conversion unit executes conversion processing, and a data processing unit that executes data processing on the digital image data on the basis of the clock signal output by the clock control unit, wherein output of the data processing unit is input to the processor. In this manner, the aforementioned light receiving device may execute operation according to control from the outside by being connected to an external processor.

In addition, according to an embodiment, a light receiving method includes photoelectrically converting, by a light receiving unit, light received in a plurality of pixels to acquire an analog image signal, converting, by a conversion unit, the analog image signal acquired by an imaging unit into digital image data, and executing, by a data processing unit, data processing on the digital image data such that a load of the data processing in a period in which the conversion unit executes conversion is reduced as compared to a period in which the conversion unit does not execute conversion.

The light receiving device of the electronic apparatus may arbitrarily include the features of the aforementioned light receiving device.

In addition, the light receiving device of the electronic apparatus may have any of the aforementioned configurations of the light receiving device.

DESCRIPTION OF EMBODIMENTS

Hereinafter, embodiments of a light receiving device and an electronic apparatus will be described with reference to the drawings. Although description will focus on main components of the light receiving device and the electronic apparatus hereinafter, the light receiving device and the electronic apparatus may have components and functions that are not illustrated or described. The following description does not exclude components or functions that are not illustrated or described.

First Embodiment

Figure 1:
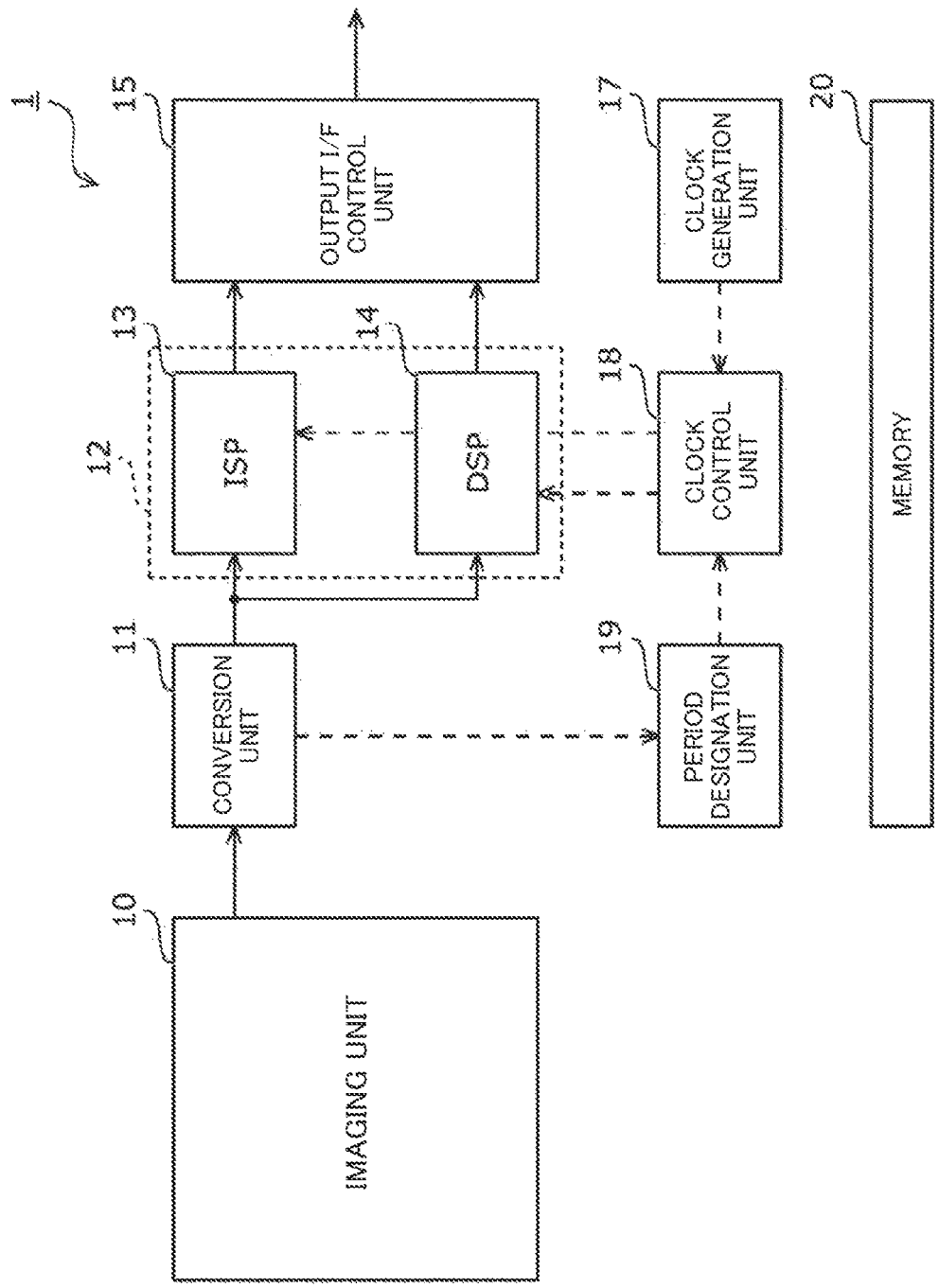
FIG. 1 is a block diagram of a light receiving device according to an embodiment.

FIG. 1 is a block diagram showing a schematic configuration of a light receiving device according to a first embodiment. The light receiving device 1 includes an imaging unit 10, a conversion unit 11, a data processing unit 12, an output interface (hereinafter, output I/F) control unit 15, a clock generation unit 17, a clock control unit 18, a period designation unit 19, and a memory 20. In FIG. 1, a data flow related to light reception is indicated by a solid line, and a signal flow related to a clock signal is indicated by a broken line.

The imaging unit 10 includes, for example, a pixel array having a plurality of pixels including light receiving elements, and an optical system for appropriately condensing light on the pixel array. The light receiving elements are, for example, photodiodes. The imaging unit 10 includes, for example, a sensor such as a complementary metal-oxide-semiconductor field-effect-transistor (CMOS) image sensor or a charge coupled device (CCD) image sensor, which appropriately processes signals received and output by the photodiodes, converts the received light into analog image data, and outputs the analog image data.

The conversion unit 11 is connected to the imaging unit 10, converts analog image data output from the imaging unit 10 into digital image data, and outputs the digital image data. The conversion unit 11 includes, for example, an analog-to-digital conversion circuit (hereinafter referred to as an analog-to-digital converter (ADC)). Further, a digital-to-analog conversion circuit (hereinafter referred to as a digital-to-analog converter (DAC)) may be provided as a part of the configuration.

The data processing unit 12 is connected to the conversion unit 11 and executes predetermined processing on digital image data output from the conversion unit 11. As shown in FIG. 1, the data processing unit 12 includes, for example, an image processing unit (hereinafter, image signal processor (ISP)) 13 and a digital signal processing unit (hereinafter, digital signal processor (DSP)) 14. The data processing unit 12 is controlled to reduce a load, that is, curb a load current at the timing (period) when the conversion unit 11 performs data conversion.

The ISP 13 executes arbitrary image processing on digital image data output by the conversion unit 11 and outputs the data. Image processing includes processing such as size conversion, rotation, noise removal, blur removal, and edge enhancement but is not limited thereto.

The DSP 14 executes arbitrary signal processing on the digital image data output by the conversion unit 11 and outputs the data. The signal processing includes processing such as recognition, detection, and feature amount extraction but is not limited thereto. The DSP 14 performs signal processing using, for example, a trained neural network model. In addition, it may execute reinforcement learning, retraining, and the like according to a request from the outside.

The output I/F control unit 15 connects the data processing unit 12 to an output I/F (not shown). The output I/F 15 controls the output I/F to control output of the data processed by the data processing unit 12 to the outside. The output I/F control unit 15 controls the output I/F such that data appropriately processed by the ISP 13 and the DSP 14, and the like are output to an external processor, memory, and the like, for example.

Further, although not illustrated, the light receiving device 1 may include an input I/F and an input I/F control unit. In this case, it is possible to transmit a request from the outside to the light receiving device 1 via the input I/F such that appropriate processing is executed and it is also possible to designate a target to be imaged and an imaging timing. In this manner, the light receiving device 1 can transmit/receive signals and data to/from an external processor, memory, and the like via the input/output I/F. It is also possible to operate the light receiving device 1 according to a request from the outside.

Each of the aforementioned units executes processing based on, for example, a clock signal. For example, the data processing unit 12 is synchronized and refreshed by the clock signal to operate appropriately.

The clock generation unit 17 outputs a clock signal to be output to each unit that executes processing of the light receiving device 1. The clock generation unit 17 outputs, for example, a signal having a predetermined frequency and outputs the signal as a clock signal. The predetermined frequency does not necessarily have to be always constant and may be appropriately changed on the basis of the environment of the light receiving device 1, and the like. For example, at a timing of activating the light receiving device 1, the predetermined frequency may be determined within an allowable range by an instruction from the outside.

In particular, the clock control unit 18 controls the clock signal input to the data processing unit 12. For example, when the data processing unit 12 executes processing at the timing when analog-to-digital (AD) conversion is executed in the conversion unit 11, noise may be mixed in digital image data due to a load current caused by the processing. In order to curb this noise, at the timing when the conversion unit 11 executes AD conversion, the clock signal generated by the clock generation unit 17 is controlled such that the operation of the data processing unit 12 is curbed and output to the data processing unit 12.

The clock control unit 18 converts the clock signal into a signal having a frequency lower than the predetermined frequency generated by the clock generation unit 17 and outputs the signal, for example. Having a frequency lower than the predetermined frequency is a concept including cutting off the clock signal. The clock control unit 18 includes, for example, a circuit that cuts off the clock signal depending on conditions or a circuit that divides the clock signal depending on conditions.

The clock control unit 18 may collectively output the same clock signal to all components of the data processing unit 12. In this case, a signal line, an output bus, and the like from the clock control unit 18 to the data processing unit 12 may be one system.

As another example, the clock control unit 18 may output an arbitrary clock signal to each of the ISP 13 and the DSP 14, that is, an arbitrary element of the data processing unit 12, as shown in FIG. 1. In this case, there may be a plurality of signal lines, output buses, and the like from the clock control unit 18 to the data processing unit 12. For example, a clock frequency of the ISP 13 may be set to the predetermined frequency generated by the clock generation unit 17, and a clock frequency of the DSP 14 may be controlled such that it has a frequency lower than the predetermined frequency. In this manner, clock signals that are separately controlled in respective components of the data processing unit 12 may be output.

For example, when current fluctuation in the ISP 13 is insignificant, the clock control unit 18 outputs the clock signal having the predetermined frequency to the ISP 13 regardless of designation from the period designation unit 19. On the other hand, the clock control unit 18 may output, to the DSP 14, a clock signal controlled to have a frequency lower than the predetermined frequency according to designation from the period designation unit 19. That is, the clock control unit 18 may control and output the clock signal generated by the clock generation unit 17 for at least a part of the data processing unit 12.

The period designation unit 19 is connected to the clock control unit 18 and designates a period in which the clock signal output by the clock control unit 18 to the data processing unit 12 is controlled. The period designation unit 19 acquires, for example, a period in which AD conversion is executed from the conversion unit 11 and notifies the clock control unit 18 of this period. For example, the conversion unit 11 may notify the period designation unit 19 of the timing at which AD conversion is executed by itself, the period designation unit 19 may designate the period on the basis of the notification and notify the clock control unit 18 of the period.

The memory 20 stores data necessary for the light receiving device 1. For example, when a trained neural network model is used in the DSP 14, parameters used in the model may be stored. When filter processing is executed in the data processing unit 12, coefficients used for the filter processing may be stored. Further, data acquired by the imaging unit 10, the conversion unit 11, and the like, and data processed by the data processing unit 12 may be stored. In addition, any other data, for example, data used to control the light receiving device 1 may be stored. Although a data flow is not shown in FIG. 1, the memory 20 is appropriately connected to necessary components.

Figure 2:
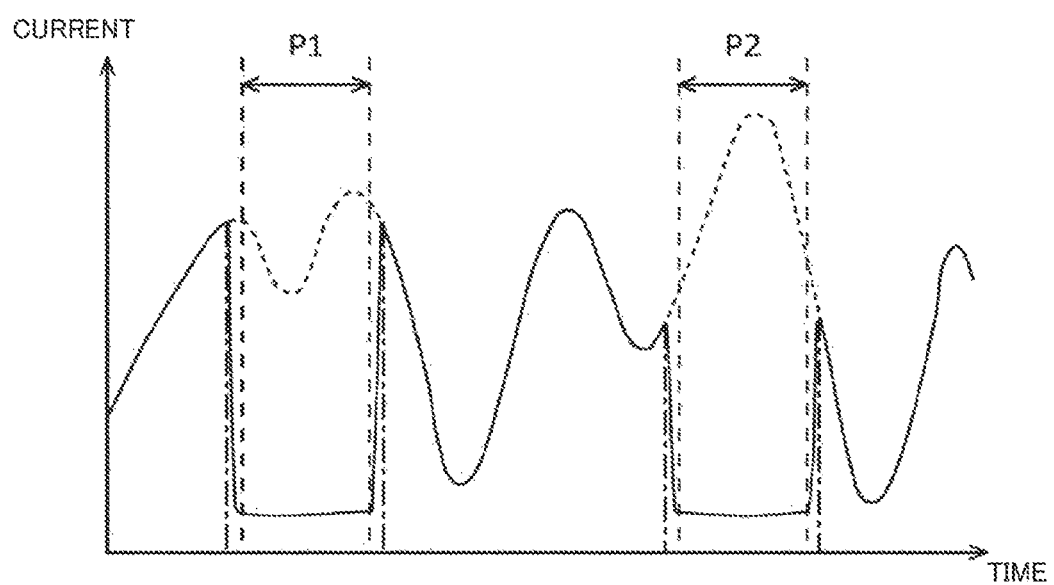
FIG. 2 is a diagram showing a load current of a data processing unit according to an embodiment.

FIG. 2 is a diagram showing an example of the relationship between a load current and time in the data processing unit 12. In FIG. 2, periods P1 and P2 indicated by broken lines are periods in which the conversion unit 11 executes signal conversion. When the data processing unit 12 executes data processing in these periods, noise may be mixed in digital image data output by the conversion unit 11 due to the load current of the data processing unit 12 indicated by a dotted line.

Therefore, in these periods P1 and P2, the clock control unit 18 controls the clock signal to convert it into a clock signal lower than a predetermined frequency and controls the data processing speed (including a refresh rate) of the data processing unit 12. By controlling the clock frequency by the clock control unit 18, for example, the load current of the data processing unit 12 is curbed as indicated by a solid line from the level indicated by the dotted line at least in a period including the periods P1 and P2. As a result, it is possible to reduce noise mixed during data conversion in the conversion unit 11.

As in periods indicated by alternate long and short dash lines in FIG. 2, clock control may be executed with a margin for the periods P1 and P2. Therefore, the period designation unit 19 may designate a period with a margin and notify the clock control unit 18 of the period. The conversion unit 11 may notify the period designation unit 19 of a start timing at a timing before a timing of starting execution of AD conversion. By notifying the conversion unit 11 in this manner, the noise reduction effect can be further achieved.

As described above, the clock control unit 18 may perform control of stopping the clock frequency output to the data processing unit 12 or may perform control of converting the clock frequency into to a clock signal having a frequency lower than a predetermined frequency. In the case of control not to stop, for example, a clock frequency of the data processing unit 12 within a range determined to be free from the influence of noise in conversion of the conversion unit 11 or sufficiently small may be measured in advance and control may be performed such that the frequency is equal to or lower than the clock frequency.

Figure 3:
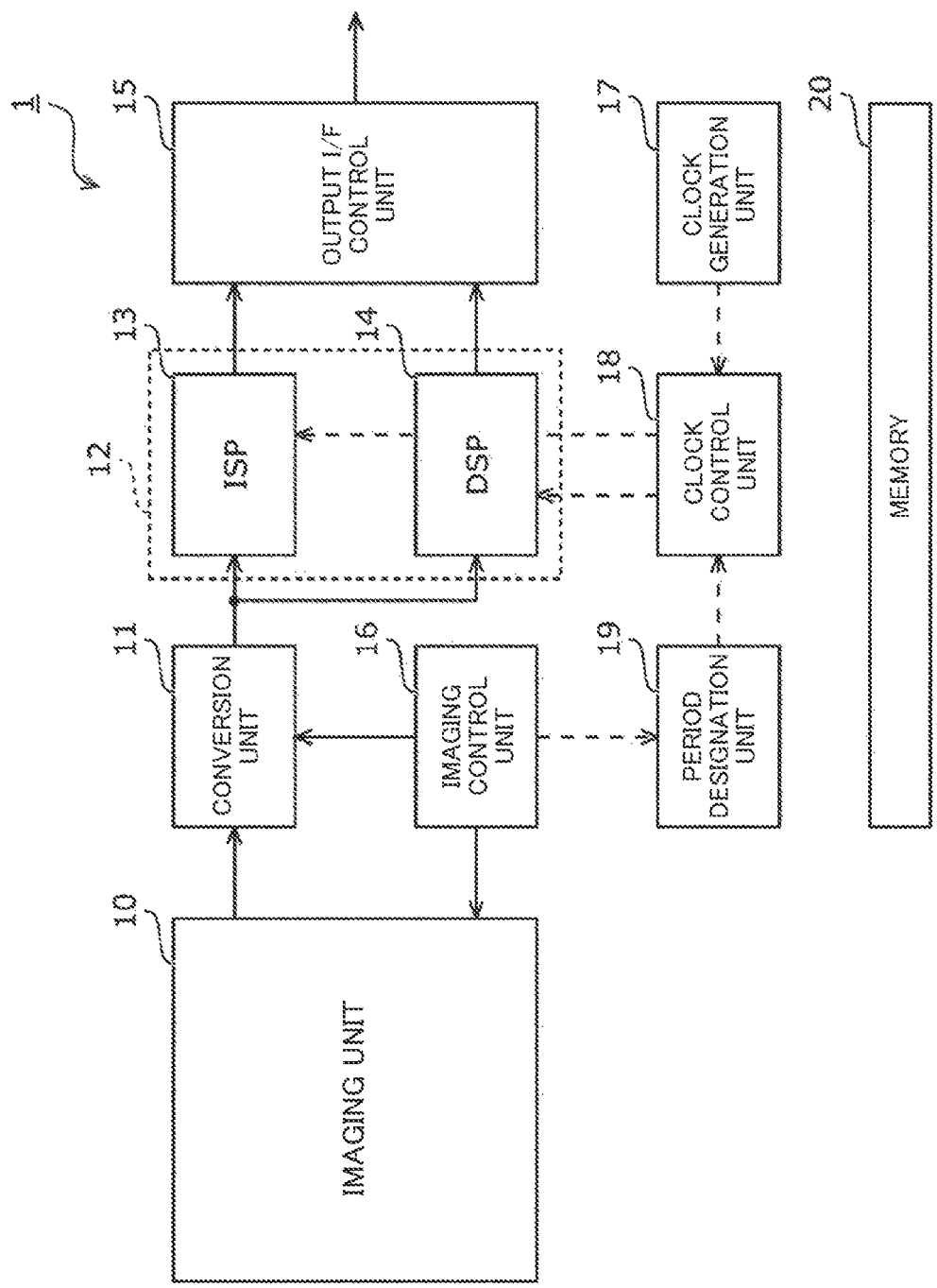
FIG. 3 is a block diagram of a light receiving device according to an embodiment.

FIG. 3 is an example showing another form of the light receiving device 1. The light receiving device 1 may further include an imaging control unit 16. The imaging control unit 16 controls a timing at which the imaging unit 10 captures an image. The imaging control unit 16 controls an imaging timing at an arbitrary timing automatically or via an input I/F that is not shown.

The imaging control unit 16 notifies the imaging unit 10, the conversion unit 11, and the period designation unit 19 of the imaging timing. The imaging unit 10 performs imaging on the basis of the notified timing. The conversion unit 11 acquires a timing at which analog image data is received from the imaging unit 10 on the basis of the notified timing and executes data conversion on the basis of the data reception timing. The period designation unit 19 acquires a period in which the conversion unit 11 executes data conversion on the basis of the notified timing and designates a period in which the clock control unit 18 decreases the clock frequency.

When the imaging control unit 16 notifies the imaging unit 10, the conversion unit 11, and the period designation unit 19 of the imaging timing in this manner, the clock frequency can be controlled such that a load current sufficiently decreases in periods indicated by the alternate long and short dash lines in FIG. 2, that is, the periods P1 and P2.

Next, the operation of the period designation unit 19 to designate a period on the basis of notification of the imaging timing from the imaging control unit 16 will be described.

Figure 4:
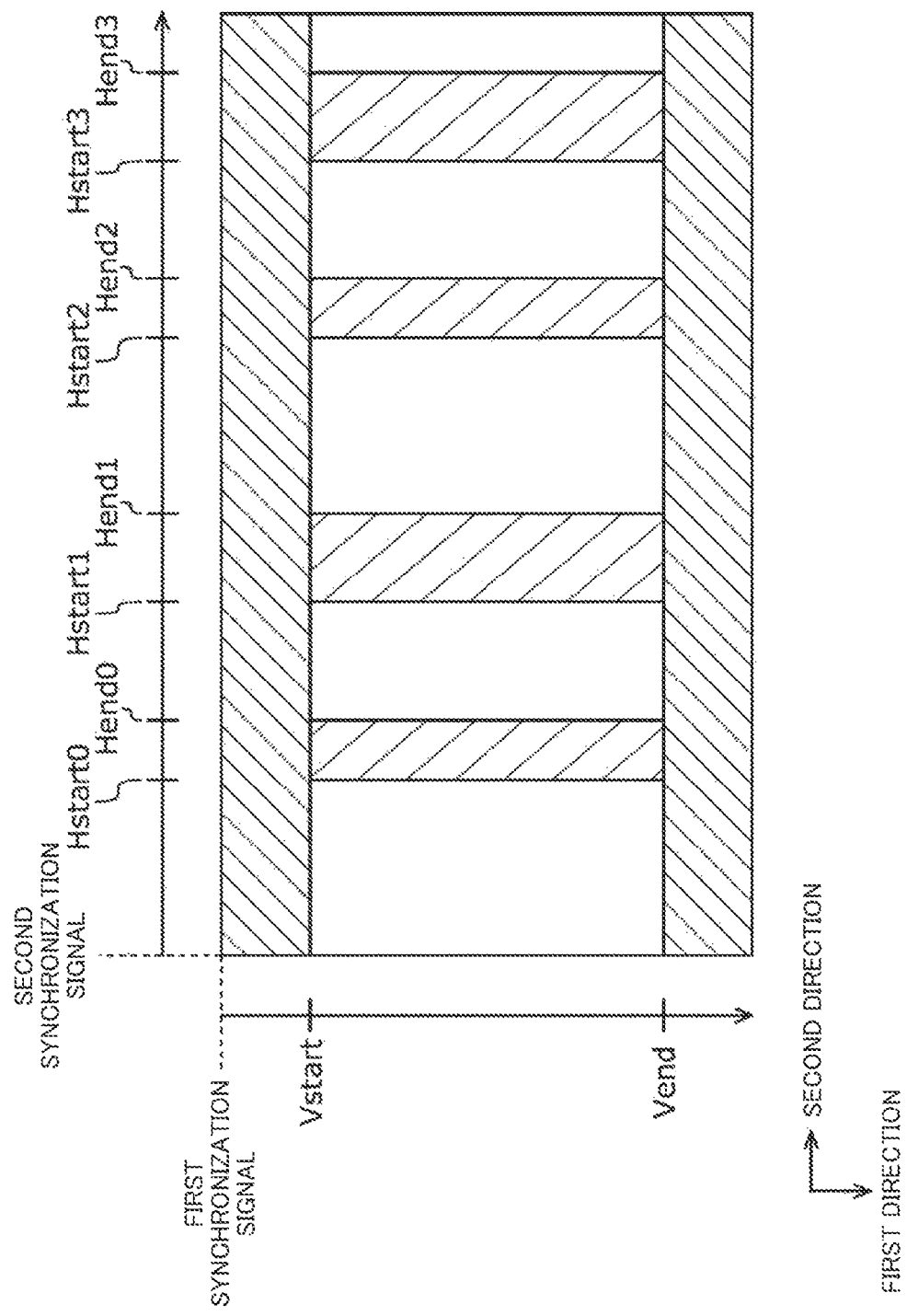
FIG. 4 is a diagram showing a state of imaging according to an embodiment.

FIG. 4 is a diagram showing a state of imaging in the pixel array according to an embodiment. As shown in the lower left of the figure, a first direction and a second direction intersecting the first direction are defined. The whole pixel array is not used for imaging, and pixels belonging to a set imaging area may receive light and generate an analog signal. In FIG. 4, for example, signal acquisition is started from the upper left pixel of the imaging area, and signals are continuously acquired with respect to pixels in the second direction first. Upon acquisition of signals up to the rightmost pixel in the top row, signals are similarly acquired from the leftmost pixel in the next row shifted in the first direction.

The imaging control unit 16 generates and outputs a first synchronization signal at the timing of starting imaging.

The imaging unit 10 starts acquisition of an analog signal in the first direction, that is, imaging of the entire imaging area by receiving the first synchronization signal. Upon receiving the first synchronization signal, the imaging unit 10 starts acquisition of an analog signal in one row from the first row in the imaging area in the pixel array in the second direction. Analog signals of a plurality of rows instead of one row may be acquired at the same timing. Although the number of rows will be described below as one, there may be a plurality of rows.

The imaging control unit 16 outputs a second synchronization signal at a timing when imaging of one row is completed in the second direction and imaging of the next row is started.

Upon receiving the second synchronization signal, the imaging unit 10 starts imaging from the row following the row where imaging is completed. In this manner, the imaging unit 10 performs imaging in the second direction from the timing when the imaging control unit 16 outputs the second synchronization signal.

This operation is repeated until analog signals are acquired in all areas used for imaging in the pixel array. That is, the imaging control unit 16 outputs the second synchronization signal until imaging is completed, and the imaging unit 10 executes imaging for one row in the second direction on the basis of the second synchronization signal.

The conversion unit 11 converts an analog image signal acquired by the imaging unit 10 into digital image data at a predetermined timing. For example, when a blanking period is set in the first direction, the conversion unit 11 does not perform conversion in the blanking period. The blanking period is, for example, a period indicated by right upward diagonal lines in FIG. 4. According to the example of FIG. 4, after receiving the first synchronization signal, the conversion unit 11 executes data conversion on the basis of conditions between Vstart and Vend. That is, the conversion unit 11 may not perform data conversion from reception of the first synchronization signal until Vstart elapsed and after Vend has passed.

Vstart and Vend are, for example, values set according to imaging conditions. Therefore, the conversion unit 11 can acquire the values of Vstart and Vend by acquiring the imaging conditions. That is, it is possible to determine the blanking period in which processing is not executed by receiving the first synchronization signal.

The conversion unit 11 executes data conversion at a predetermined timing during the period from the first synchronization signal to Vstart to Vend. For example, as shown in FIG. 4 by periods indicated by left upward diagonal lines, processing of converting an analog image signal to digital image data is executed at timings of Hstart0 to Hend0, Hstart1 to Hend1, Hstart2 to Hend2, and Hstart3 to Hend3 from the second synchronization signal. Although periods are indicated on the pixel array in FIG. 4, this means that the conversion unit 11 executes data conversion in periods in which the imaging unit 10 performs imaging in the pixels.

Since the values of Hstart0, Hend0, Hstart1, Hend1, Hstart2, Hend2, Hstart3, and Hend3 are also determined on the basis of the imaging conditions like Vstart and Vend, the conversion unit 11 can acquire these values by obtaining the imaging conditions. That is, the conversion unit 11 can appropriately set a conversion execution timing by receiving the second synchronization signal and execute data conversion in the set period.

Similarly, the period designation unit 19 can acquire offset information from each synchronization signal of Vstart, Vend, and Hstart0, Hend0, Hstart1, Hend1, Hstart2, Hend2, Hstart3, and Hend3. Therefore, it is possible to acquire a period in which the conversion unit 11 performs data conversion by receiving the first synchronization signal and the second synchronization signal.

For example, the period designation unit 19 determines a period from reception of the first synchronization signal to Vstart as a period in which the conversion unit 11 does not execute data conversion and notify the clock control unit 18 of the period as a period in which a clock signal having a predetermined frequency is output. Similarly, the period designation unit 19 may determine a period after Vend has elapsed from reception of the first synchronization signal as a period in which the conversion unit 11 does not execute data conversion and notify the clock control unit 18 of the period as a period in which a clock signal having a predetermined frequency is output.

For example, the period designation unit 19 may set, on the basis of a time when the first synchronization signal is received, a time from this time until Vstart elapses, and a time after Vend has elapsed after this time as first predetermined periods. The period designation unit 19 may output the first predetermined periods to the clock control unit 18 as periods in which a predetermined frequency is output.

Since the period designation unit 19 has acquired offset information such as Hstart0 as described above in periods other than the first predetermined period, the conversion unit 11 can extract a period in which data conversion will be performed when the second synchronization signal is received. Therefore, the period designation unit 19 designates a period in which a clock signal for reducing the load of the data processing unit 12 is controlled in the period in which the conversion unit 11 performs data conversion.

Figure 5:
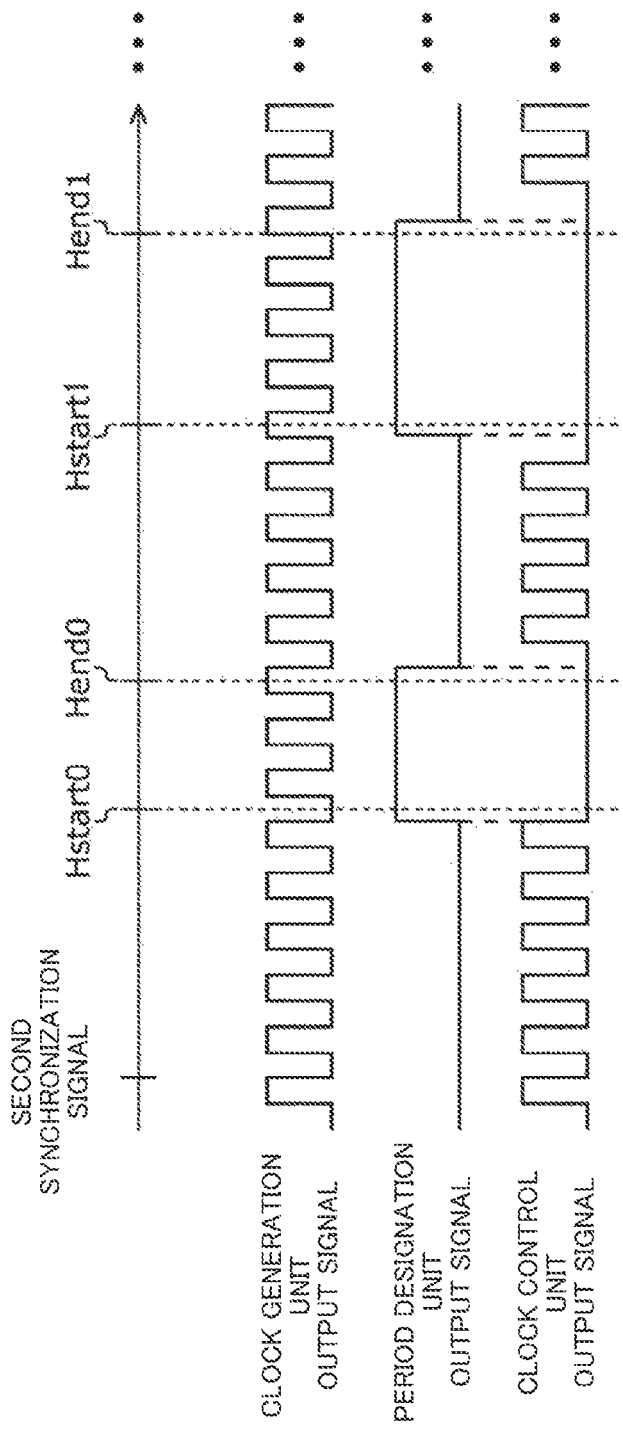
FIG. 5 is a diagram showing an example of clock control according to an embodiment.

FIG. 5 is a timing chart showing an example of designation of a period of the period designation unit 19 and control of a clock signal of the clock control unit 18 in periods other than the first predetermined periods. As an example, control of periods including Hstart0, Hend0, Hstart1, and Hend1 is shown, but the same applies to other periods. Hstart0, Hend0, Hstart1 and Hend1 in the figure are based on the time when the second synchronization signal is received.

The imaging control unit 16 outputs the second synchronization signal. The clock generation unit 17 continues to output a clock signal having a predetermined frequency. The period designation unit 19 receives the second synchronization signal, designates a period including at least Hstart0 to Hend0 and a period including at least Hstart1 to Hend1 as second predetermined periods and outputs the second predetermined periods to the clock control unit 18. The clock control unit 18 performs control such that the clock signal is not output in the periods designated by the period designation unit 19. As a result, processing in the data processing unit 12 can be stopped in the second predetermined periods, and noise in periods in which the conversion unit 11 executes data conversion can be reduced. As described above, the clock control unit 18 may control and output the clock frequency in the second predetermined periods for at least some components instead of all components of the data processing unit 12. In this case, for the other components of the data processing unit 12, the clock control unit 18 outputs a clock signal having a predetermined frequency.

As shown in the figure, the period designation unit 19 may designate periods with some margin for Hstart0, Hend0, Hstart1, and Hend1. For example, times from a little before Hstart0 and Hstart1 to a little after Hend0 and Hend1 may be designated as the second predetermined periods. These times may be, for example, about ¼ cycle of a predetermined frequency as shown, but are not limited to FIG. 5. For example, the times may have another margin such as one cycle of the predetermined frequency. It is assumed that the method of taking this margin can be changed according to settings.

Figure 6:
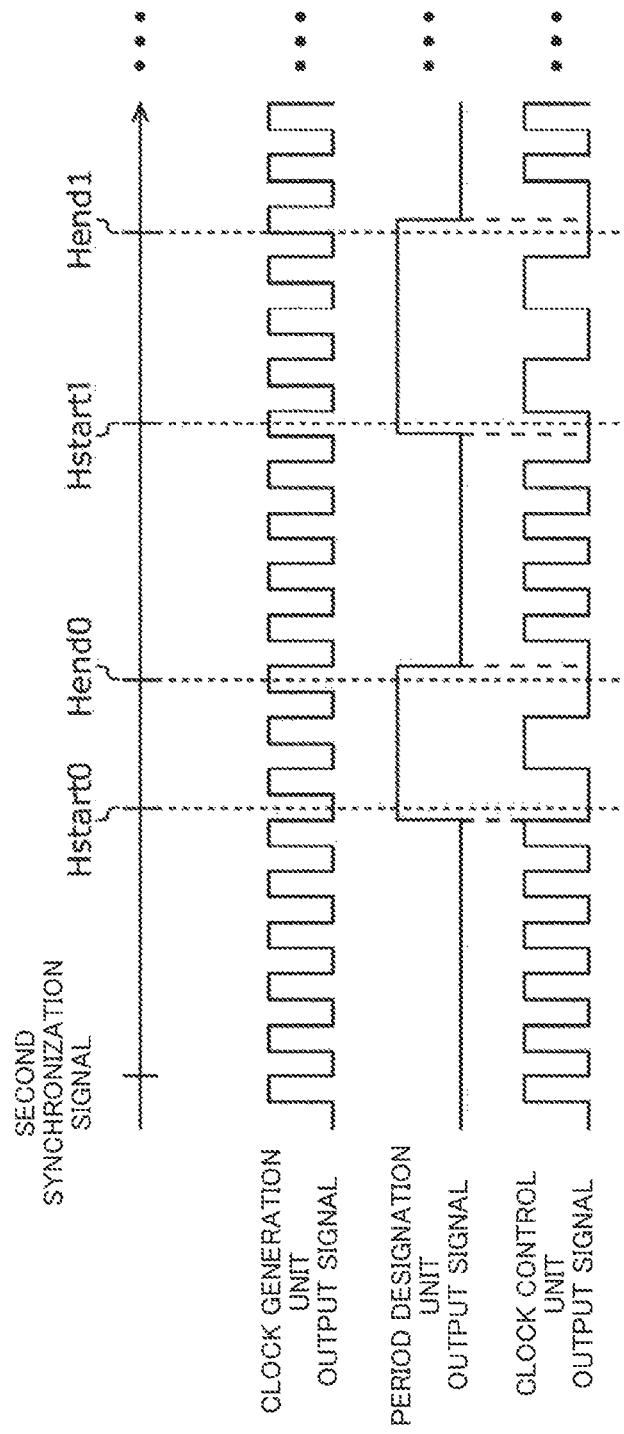
FIG. 6 is a diagram showing an example of clock control according to an embodiment.

FIG. 6 is a diagram showing another control example of the clock control unit 18. For example, the clock control unit 18 may control the clock signal such that it changes to a clock signal having a frequency lower than the predetermined frequency in periods designated by the period designation unit 19. For example, as shown in FIG. 6, the clock signal generated by the clock generation unit 17 may be frequency-divided by ½ and output. In this manner, it is also possible to reduce the load current of the data processing unit 12 by controlling the clock signal such that it has a frequency lower than the predetermined frequency.

Figure 7:
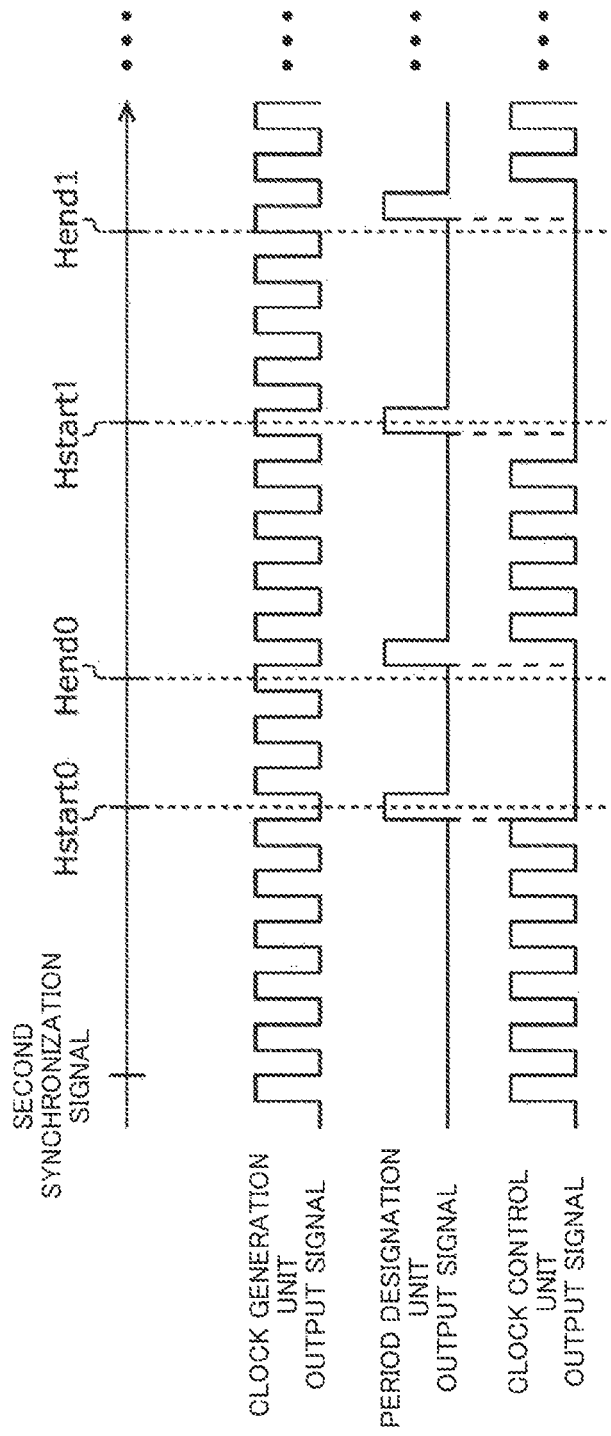
FIG. 7 is a diagram showing an example of clock control according to an embodiment.

FIG. 7 is a diagram showing another example of period designation of the period designation unit 19. The period designation unit 19 may output a pulse at the start and end timings of the second predetermined periods and designate periods. The clock control unit 18 switches control of the clock frequency on the basis of the received pulse. The period designation unit 19 may designate periods such that modes are switched by a toggle signal as shown in FIG. 5 and FIG. 6, for example, or may designate periods such that control is switched by a trigger signal as shown in FIG. 7. Although FIG. 7 shows a case where the clock control unit 18 stops and controls output of the clock signal, the present invention is not limited thereto. As shown in FIG. 6, the clock control unit 18 may receive a pulse signal and perform control such that the clock signal has a clock frequency lower than the predetermined frequency.

Figure 8:
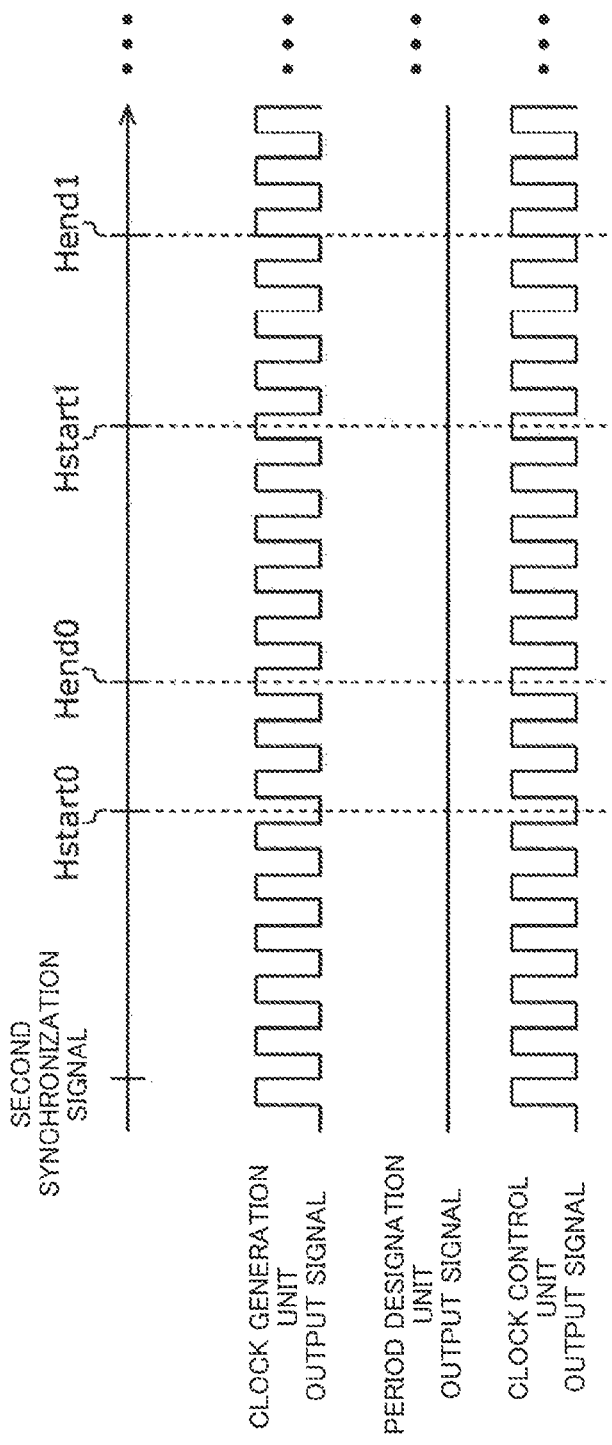
FIG. 8 is a diagram showing an example of clock control according to an embodiment.

FIG. 8 is a diagram showing an example of clock output in blanking periods, that is, the first predetermined periods. In the case of the first predetermined periods, the period designation unit 19 does not output a signal for controlling clocks regardless of a predetermined time such as Hstart0 even if the second synchronization signal is received. By not designating periods, the clock control unit 18 outputs a clock signal having a predetermined frequency generated by the clock generation unit 17. In this manner, the period designation unit 19 may determine that periods are the first predetermined periods, and in the case of the first predetermined periods, the clock signal may not be controlled such that it has a frequency lower than the predetermined frequency.

The timings of Vstart, Vend, Hstart0, Hend0, Hstart1, Hend1, Hstart2, Hend2, Hstart3, and Hend3 are not limited to those shown in FIG. 4. For example, the blanking period may have three or more periods. The period in which the conversion unit 11 executes data conversion may be longer or shorter than that shown in FIG. 4. In addition, there may be a period in which data conversion is performed even after Vend has elapsed. For example, after imaging of the last row is completed, there may be a period for executing data conversion of an analog image signal acquired in the last row. Further, in a period from reception of the first synchronization signal until Vstart, for example, the period designation unit 19 lowers the frequency of the clock signal below the predetermined frequency on the basis of the second synchronization signal and Hstart0, Hend0, and the like.

As described above, according to the present embodiment, it is possible to curb mixing of noise in conversion processing in the conversion unit 11 by reducing processing of the data processing unit 12, that is, decreasing the load current in the data processing unit 12 in a period in which the conversion unit 11 converts an analog image signal acquired by the imaging unit 10 into digital image data. It is possible to achieve the above-described operation without including a complicated circuit, that is, without increasing a circuit size so much by acquiring a synchronization signal output in imaging, controlling the clock signal, and reducing the load current in the data processing unit 12. In this manner, it is possible to perform information processing such as highly reliable recognition processing and detection processing in the light receiving device 1 and it is also possible to reduce mixing of noise at timings of image processing and signal processing, and thus an intelligent light receiving device 1 capable of performing information processing such as recognition processing and detection processing as well as simply performing imaging is provided.

(Chip Structure of Light Receiving Device 1)

Figure 9:
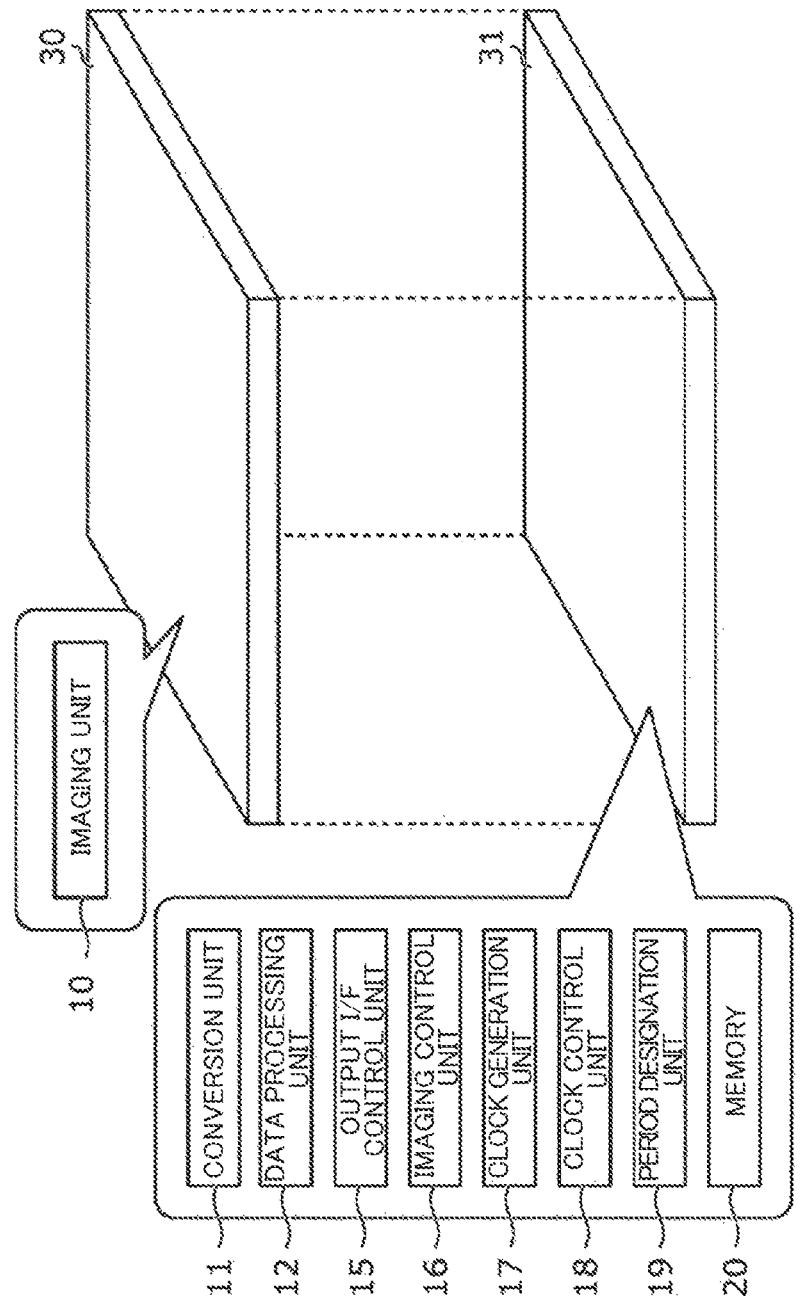
FIG. 9 is a diagram showing an implementation example of the light receiving device according to an embodiment.

Next, the chip structure of the light receiving device 1 of FIG. 1 will be described. FIG. 9 is a diagram showing an example of the chip structure of the light receiving device 1 of FIG. 1. The light receiving device 1 in FIG. 9 is a laminated body in which a first substrate 30 and a second substrate 31 are laminated. The first substrate 30 and the second substrate 31 may be called dies. Although the first substrate 30 and the second substrate 31 are rectangular in the example of FIG. 9, specific shapes and sizes of the first substrate 30 and the second substrate 31 are arbitrary. Further, the first substrate 30 and the second substrate 31 may have the same size or different sizes.

The pixel array of the imaging unit 10 shown in FIG. 1 is disposed on the first substrate 30. Further, at least a part of the optical system of the imaging unit 10 may be mounted on the first substrate 30 on-chip.

The conversion unit 11, the data processing unit 12, the output I/F control unit 15, the imaging control unit 16, the clock generation unit 17, and the clock control unit 18, the period designation unit 19, and the memory 20, shown in FIG. 1, are disposed on the second substrate 31. In addition, an input/output interface unit, a power supply circuit, various processors (CPU: Central Processing Unit), a selector, and the like, which are not shown, may be disposed on the second substrate 31.

As a specific form of bonding, a so-called CoC (Chip on Chip) method in which the first substrate 30 and the second substrate 31 are cut out from a wafer, separated into individual pieces, and then laminated vertically, and then bonded may be adopted. Alternatively, a so-called CoW (Chip on Wafer) method in which one of the first substrate 30 and the second substrate 31 (for example, the first substrate 30) is cut out from a wafer and separated into individual pieces, and then the separated individual pieces of the first substrate 30 are bonded to the second substrate 31 before separation into individual pieces may be adopted. Alternatively, a so-called WoW (Wafer on Wafer) method in which the first substrate 30 and the second substrate 31 are bonded in a wafer state may be adopted.

For example, plasma bonding or the like can be used as a bonding method for the first substrate 30 and the second substrate 31. However, various other bonding methods may be used.

Figure 10:
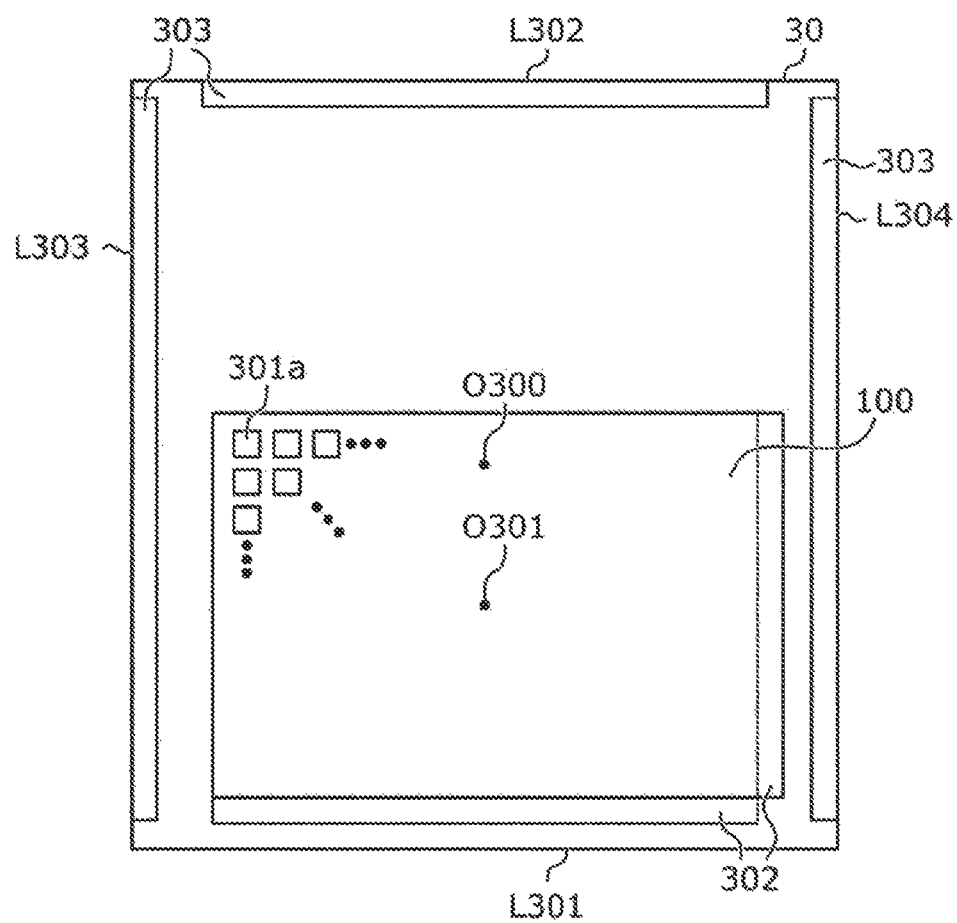
FIG. 10 is a diagram showing a layout example of a first substrate according to an embodiment.
Figure 11:
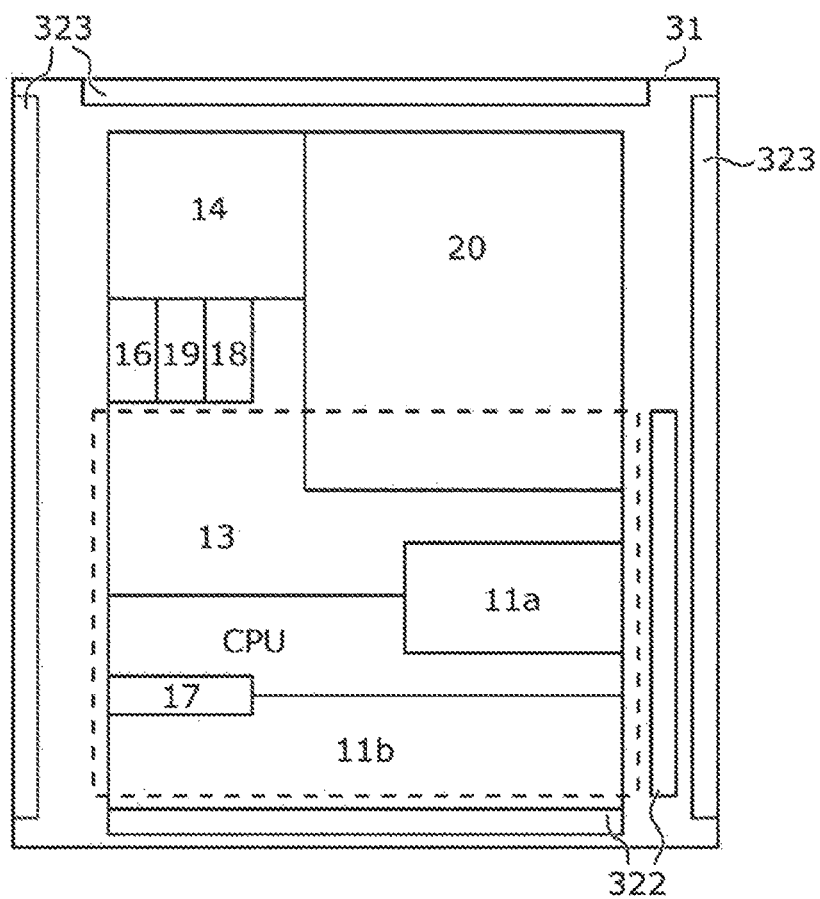
FIG. 11 is a diagram showing a layout example of a second substrate according to an embodiment.

FIG. 10 and FIG. 11 are diagrams showing an example of a layout of the first substrate 30 and the second substrate 31. FIG. 10 shows a layout example of the first substrate 30 in which the pixel array 100 of the imaging unit 10 is disposed. In the example of FIG. 10, the pixel array 100 is disposed on the side of one side L301 of the four sides L301 to L304 of the first substrate 30. In other words, the pixel array 100 is disposed such that the center portion O301 thereof is closer to the side L301 than the center portion O300 of the first substrate 30. When the surface of the first substrate 30 on which the pixel array 100 is provided is rectangular, the side L301 may be, for example, a shorter side of the first substrate 30. However, the present invention is not limited thereto, and the pixel array 100 may be disposed on a longer side.

In an area close to the side L301 among the four sides of the pixel array 100, in other words, in the area between the side L301 and the pixel array 100, a through silicon via (hereinafter referred to as TSV) array 302 in which a plurality of TSVs penetrating the first substrate 30 are arranged is provided as wiring for electrically connecting each pixel 301a in the pixel array 100 to the conversion unit 11 disposed on the second substrate 31. By providing the TSV array 302 close to the side L301 on which the pixel array 100 is disposed in this manner, it becomes easy to secure an arrangement space for the conversion unit 11 and the like on the second substrate 31.

The TSV array 302 may also be provided in an area close to the side L304, which is one of the two sides L303 and L304 intersecting the side L301 (however, the side L303 is possible), in other words, the area between the side L304 (or the side L303) and the pixel array 100.

On each of the sides L302 and L303 on which the pixel array 100 is not disposed among the four sides L301 to L304 of the first substrate 30, a pad array 303 having a plurality of pads arranged in a straight line is provided. The pad array 303 may include, for example, pads (also referred to as power supply pins) to which a power supply voltage for analog circuits such as the pixel array 100 and the conversion unit 11 is applied. Further, the pad array 303 may include pads (also referred to as power supply pins) to which a power supply voltage for digital circuits such as the conversion unit 11, the data processing unit 12, the output I/F control unit 15, the imaging control unit 16, the clock generation unit 17, the clock control unit 18, the period designation unit 19, and the memory 20 is applied. Alternatively, the pad array 303 may include pads (also referred to as signal pins) for interfaces such as mobile industry processor interface (MIPI) and a serial peripheral interface (SPI). Alternatively, the pad array 303 may include pads (also referred to as signal pins) for input/output of a clock signal and data. Each pad is electrically connected to, for example, an external power supply circuit or interface circuit via a wire. It is desirable that each pad array 303 be sufficiently separated from the TSV array 302 such that the influence of reflection of a signal from the wire connected to each pad in the pad array 303 can be ignored.

FIG. 11 shows a layout example of the second substrate 31 on which the conversion unit 11, the data processing unit 12, the output I/F control unit 15, the imaging control unit 16, the clock generation unit 17, the clock control unit 18, the period designation unit 19, and the memory 20 are disposed. On the second substrate 31, at least the conversion unit 11, the data processing unit 12, the output I/F control unit 15, the imaging control unit 16, the clock generation unit 17, the clock control unit 18, the period designation unit 19, and the memory 20 are disposed. In the layout example of FIG. 11, the conversion unit 11 is divided into two areas, that is, an ADC 11a and a DAC 11b. The DAC 11b is a circuit that supplies a reference voltage for AD conversion to the ADC 11a and is included in a part of the conversion unit 11. Although not illustrated in FIG. 11, the output I/F control unit 15, a selector, a CPU, and the like are also disposed on the second substrate 31.

In addition, wiring 322 which is electrically connected to each TSV in the TSV array 302 penetrating the first substrate 30 (hereinafter simply referred to as the TSV array 302) by coming into contact therewith is provided on the second substrate 31. Further, a pad array 323 in which a plurality of pads electrically connected to the respective pads in the pad array 303 of the first substrate 30 are linearly arranged is provided on the second substrate 31.

For connection between the TSV array 302 and the wiring 322, for example, a so-called twin TSV method in which two TSVs, that is, a TSV provided on the first substrate 30 and a TSV provided over the first substrate 30 and the second substrate 31, are connected on the outer surface of the chip may be adopted. Alternatively, a so-called shared TSV method in which connection is performed using a common TSV provided over the first substrate 30 and the second substrate 31 may be adopted. However, the present invention is not limited thereto, and various connection forms such as a so-called Cu—Cu bonding method in which copper (Cu) exposed to the bonding surface of the first substrate 30 and copper exposed to the bonding surface of the second substrate 31 are bonded to each other can be adopted.

The connection form between each pad in the pad array 303 of the first substrate 30 and each pad in the pad array 323 of the second substrate 31 is, for example, wire bonding. However, the present invention is not limited thereto, and a connection form such as a through hole or castellation may be used.

In the layout example of the second substrate 31, for example, the vicinity of the wiring 322 connected to the TSV array 302 is set as the upstream side and the ADC 11a, the ISP 13, and the DSP 14 are sequentially disposed from the upstream along the flow of a signal read from the pixel array 100. That is, the ADC 11a to which a pixel signal read from the pixel array 100 is first input is disposed in the vicinity of the wiring 322 which is the most upstream side, followed by the ISP 13, and the DSP 14 is disposed an area farthest from the wiring 322.

The clock generation unit 17 is disposed such that it outputs a clock signal having a predetermined frequency to the CPU, for example. The clock signal output by the clock generation unit 17 is controlled by the clock control unit 18 such that it becomes a clock signal having an appropriate frequency and output to the ISP 13 and the DSP 14. The period designation unit 19 may be disposed adjacent to the imaging control unit 16, and the clock control unit 18 may be disposed adjacent to the period designation unit 19.

By disposing the conversion unit 11 to the DSP 14 from the upstream side along the signal flow in this manner, wiring connecting respective units can be shortened. Accordingly, it is possible to promote reduction of signal delay, reduction of signal propagation loss, improvement of an S/N ratio, reduction of power consumption, and the like.

Further, the CPU is disposed in the vicinity of the wiring 322 on the upstream side, for example. In FIG. 11, the CPU is disposed such that it is in contact with the conversion unit 11 and the ISP 13. By adopting such a layout, it is possible to promote reduction of signal delay, reduction of signal propagation loss, improvement of an S/N ratio, reduction of power consumption, and the like when the CPU controls the pixel array 100. Further, the signal pins and the power supply pins for the analog circuits can be collectively disposed in the vicinity of the analog circuits (for example, the lower side in FIG. 11), and the remaining signal pins and power supply pins for the digital circuits can be collectively disposed in the vicinity of the digital circuits (for example, the upper side in FIG. 11), or the power supply pins for the analog circuits can be sufficiently separated from the power supply pins for the digital circuits.

Further, in the layout shown in FIG. 11, the DSP 14 is disposed on the side opposite to the ADC 11a, which is the most downstream side. By adopting such a layout, in other words, in the direction in which the first substrate 30 and the second substrate 31 are laminated (hereinafter, simply referred to as the vertical direction), the DSP 14 can be disposed in an area that does not overlap with the pixel array 100.

By employing a configuration in which the pixel array 100 and the DSP 14 in an area indicated by the broken line in the vertical direction do not overlap in this manner, it is possible to curb noise generated due to execution of signal processing by the DSP 14 from entering the pixel array 100. Further, it is possible to curb overlapping noise at a conversion timing in the conversion unit 11 by controlling the clock signal through the clock control unit 18 as described above. As a result, even when the DSP 14 is operated as a processing unit that executes an arithmetic operation based on a trained model, it is possible to reduce noise caused by signal processing of the DSP 14 and entering the digital image data, and thus it is possible to acquire an image with reduced quality deterioration.

The memory 20 is disposed in the vicinity of the ISP 13 and the DSP 14. The memory 20 stores digital image data and various types of information related to a trained computation model. The DSP 14 reads digital image data output by the ISP 13 as necessary and stored in a predetermined area of the memory 20, executes signal processing thereon, and stores the processed digital image data in the same or a different predetermined area of the memory 20.

The DSP 14 reads information about the computation model and digital image data output by the ISP 13 from the memory 20, performs arithmetic operation processing using the computation model, and stores the result of arithmetic operation processing in the memory 20. Further, the DSP 14 may output the arithmetic operation result to the outside via an output I/F which is not illustrated without storing the arithmetic operation result in the memory 20.

By disposing the memory 20 in the vicinity of the ISP 13 and the DSP 14 in this manner, a signal propagation time at the time of accessing the memory 20 can be shortened and thus the ISP 13 and the DSP 14 can access the memory 20 at a high speed.

The pad array 323 is disposed, for example, at a position on the second substrate 31 corresponding to the pad array 303 of the first substrate 30 in the vertical direction. Here, among the pads included in the pad array 323, pads located in the vicinity of the ADC 11a are used for propagating the power supply voltage and analog signals for the analog circuits (mainly the ADC 11a). On the other hand, the pads located in the vicinity of the CPU, the ISP 13, the DSP 14, the imaging control unit 16, the clock generation unit 17, the clock control unit 18, the period designation unit 19, and the memory 20 are used for propagating the power supply voltage and digital signals for the digital circuits (mainly, the CPU, the ISP 13, the DSP 14, the imaging control unit 16, the clock generation unit 17, the clock control unit 18, the period designation unit 19, and the memory 20). With such a pad layout, the distance on wiring connecting each pad and each unit can be shortened. Accordingly, it is possible to realize reduction of signal delay, reduction of propagation loss of signals and the power supply voltage, improvement of an S/N ratio, and reduction of power consumption.

FIG. 11 is given as an example, and disposition of each unit on the second substrate 31 is not limited thereto.

Further, although the imaging unit 10 and other components are formed on different layers and laminated in the above, the present invention is not limited thereto. For example, the imaging unit 10 and other components may be formed on the same substrate. Even in this case, the load current of the data processing unit 12 can be reduced, and thus the data processing unit 12 can be disposed near the conversion unit 11 that converts an analog signal acquired by the imaging unit 10 into digital data.

Figure 12:
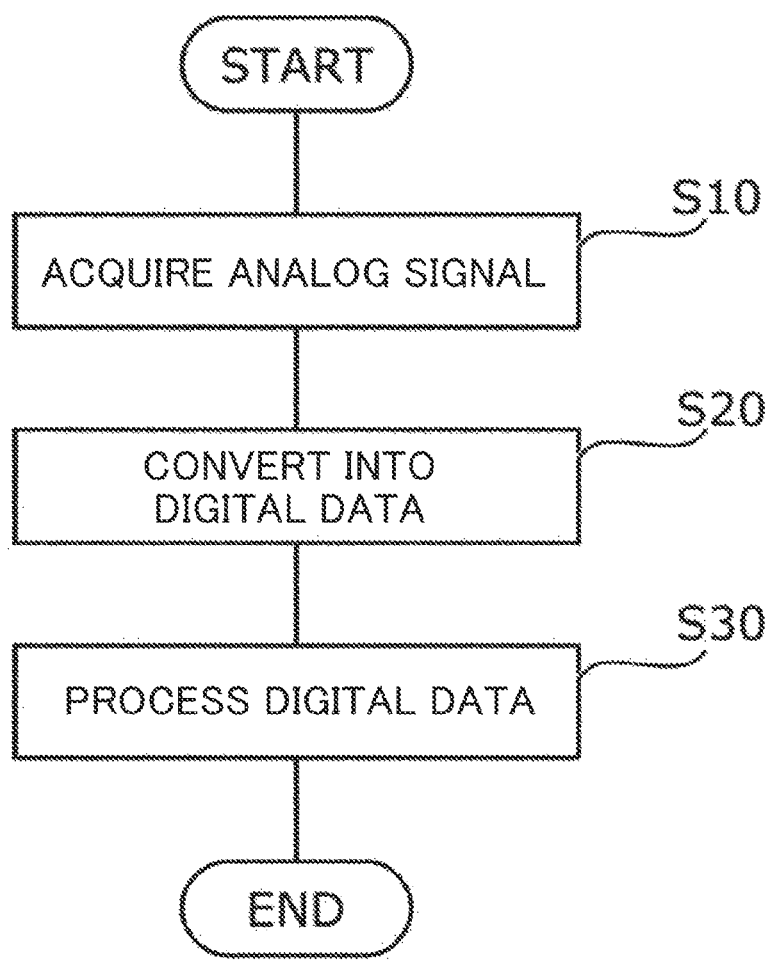
FIG. 12 is a flowchart showing processing of the light receiving device according to an embodiment.

FIG. 12 is a flowchart showing processing of light reception and data conversion in the light receiving device 1 in each of the above-described embodiments.

The light receiving device 1 receives light in the plurality of pixels of the light receiving unit provided in the imaging unit 10 and photoelectrically converts the received light to acquire an analog image signal (S10).

Next, the conversion unit 11 converts the analog image signal acquired by the imaging unit into digital image data (S20).

Next, the data processing unit 12 converts the digital image data (S30). The data processing unit 12 executes data processing on the digital image data such that a load of data processing in a period in which the conversion unit 11 executes conversion is reduced as compared to a period in which the conversion unit 11 does not execute conversion.

In this manner, a series of light receiving processing to processing of converting to digital image data is executed, and various types of processing for this digital image data are executed such that the influence on conversion from analog image data to digital image data is reduced.

(Application to Other Sensors)

Although a case where the technology according to the present disclosure is applied to the light receiving device (image sensor) 1 that acquires a two-dimensional image is exemplified in the first and second embodiments described above, the application destination of the technology according to the present disclosure is not limited to the light receiving device. For example, the technology according to the present disclosure can be applied to various light receiving sensors such as a Time of Flight (ToF) sensor, an infrared (IR) sensor, and a dynamic vision sensor (DVS). That is, it is possible to accomplish reduction of noise included in sensor results, reduction of a sensor chip size, and the like by employing a laminated type chip structure of the light receiving sensors.

Example of Application to Moving Body

The technology according to the present disclosure (the present technology) can be applied to various products. For example, the technology according to the present disclosure may be realized as a device mounted on any type of moving body such as an automobile, an electric vehicle, a hybrid electric vehicle, a motorcycle, a bicycle, a personal mobility, an airplane, a drone, a ship, and a robot.

Figure 13:
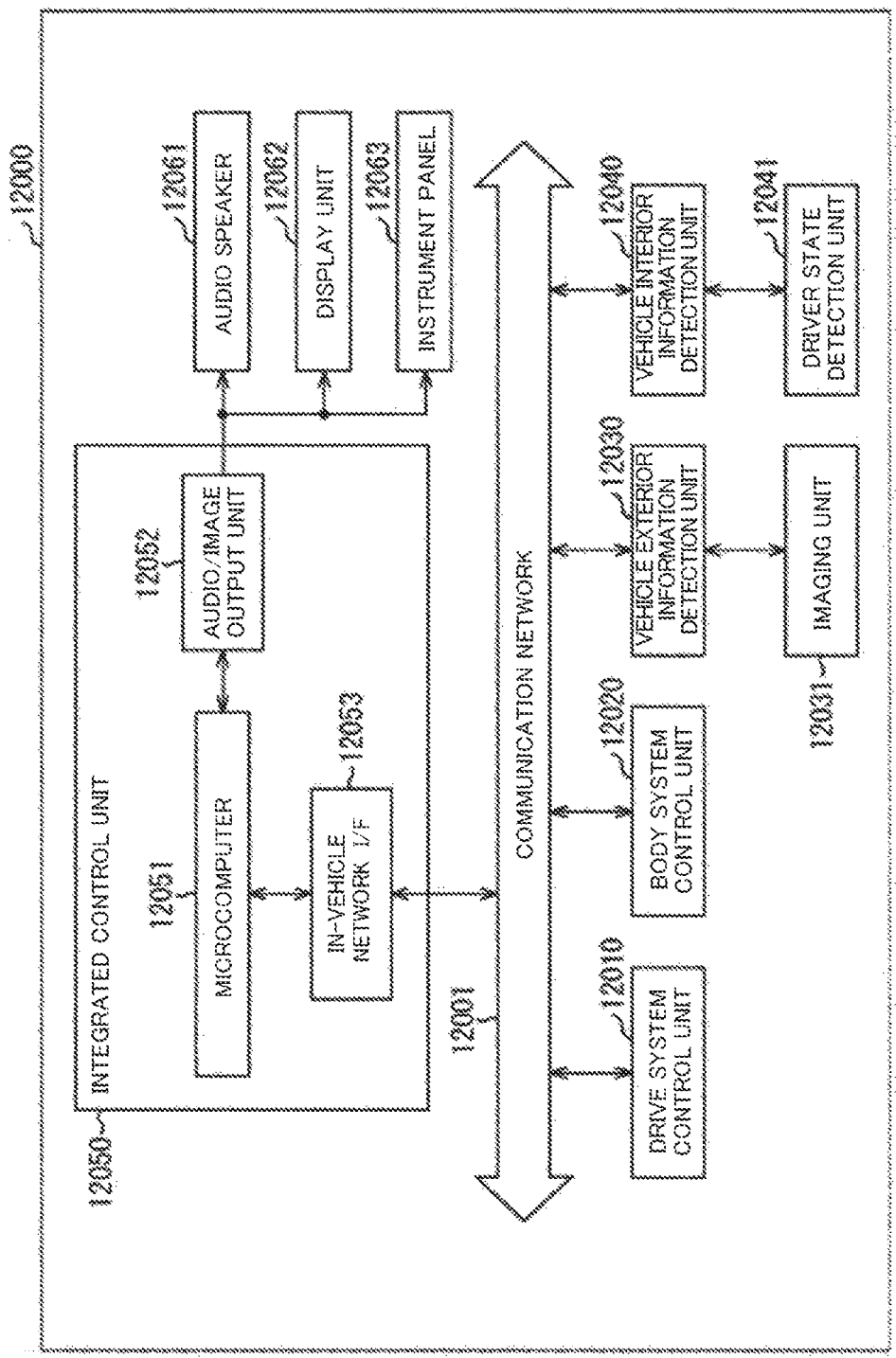
FIG. 13 is a block diagram showing a schematic configuration example of a vehicle control system that is an example of a mobile control system to which the technology according to the present disclosure can be applied.

FIG. 13 is a block diagram showing a schematic configuration example of a vehicle control system 12000 which is an example of a moving body control system to which the technology according to the present disclosure can be applied.

A vehicle control system 12000 includes a plurality of electronic control units connected via a communication network 12001. In the example illustrated in FIG. 13, the vehicle control system 12000 includes a drive system control unit 12010, a body system control unit 12020, a vehicle exterior information detection unit 12030, a vehicle interior information detection unit 12040, and an integrated control unit 12050. In addition, a microcomputer 12051, an audio/image output unit 12052, and an in-vehicle network interface (I/F) 12053 are included as functional configurations of the integrated control unit 12050 in the example shown in FIG. 13.

The drive system control unit 12010 controls operations of devices related to a drive system of a vehicle according to various programs. For example, the drive system control unit 12010 functions as a driving force generator for generating a driving force of a vehicle such as an internal combustion engine or a driving motor, a driving force transmission mechanism for transmitting a driving force to wheels, a steering mechanism for adjusting a turning angle of a vehicle, and a control device such as a braking device that generates a braking force of a vehicle.

The body system control unit 12020 controls operations of various devices mounted in the vehicle body according to various programs. For example, the body system control unit 12020 functions as a control device of a keyless entry system, a smart key system, a power window device, or various lamps such as a head lamp, a back lamp, a brake lamp, a turn signal, or a fog lamp. In this case, radio waves transmitted from a portable device that substitutes for a key or signals of various switches can be input to the body system control unit 12020. The body system control unit 12020 receives input of these radio waves or signals and controls a door lock device, a power window device, a lamp, and the like of the vehicle.

The vehicle exterior information detection unit 12030 detects information on the outside of the vehicle in which the vehicle control system 12000 is mounted. For example, an imaging unit 12031 is connected to the vehicle exterior information detection unit 12030. The vehicle exterior information detection unit 12030 causes the imaging unit 12031 to capture an image of the exterior of the vehicle and receives the captured image. The vehicle exterior information detection unit 12030 may perform object detection processing or distance detection processing for persons, vehicles, obstacles, signs, or text on a road surface on the basis of the received image.

The imaging unit 12031 is an optical sensor that receives light and outputs an electrical signal corresponding to the amount of the received light. The imaging unit 12031 can also output the electrical signal as an image and distance measurement information. In addition, light received by the imaging unit 12031 may be visible light, or may be invisible light such as infrared light.

The vehicle interior information detection unit 12040 detects information on the interior of the vehicle. For example, a driver state detection unit 12041 that detects a driver's state is connected to the vehicle interior information detection unit 12040. The driver state detection unit 12041 includes, for example, a camera that captures an image of the driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate a control target value of the driving force generator, the steering mechanism, or the braking device on the basis of the information on inside and outside the vehicle acquired by the vehicle exterior information detection unit 12030 or the vehicle interior information detection unit 12040, and output a control command to the drive system control unit 12010. For example, the microcomputer 12051 can perform coordinated control for the purpose of realizing a function of an advanced driver assistance system (ADAS) including vehicle collision avoidance, shock alleviation, following travel based on an inter-vehicle distance, cruise control, vehicle collision warning, vehicle lane departure warning, or the like.

Further, the microcomputer 12051 can perform cooperative control for the purpose of automated driving or the like in which autonomous travel is performed without depending on an operation of a driver by controlling the driving force generator, the steering mechanism, the braking device, and the like on the basis of information regarding the vicinity of the vehicle acquired by the vehicle exterior information detection unit 12030 or the vehicle interior information detection unit 12040.

Furthermore, the microcomputer 12051 can output a control command to the body system control unit 12020 on the basis of the vehicle exterior information acquired by the vehicle exterior information detection unit 12030. For example, the microcomputer 12051 can perform cooperative control for the purpose of preventing glare, such as switching from a high beam to a low beam, by controlling the head lamp according to the position of a preceding vehicle or an oncoming vehicle detected by the vehicle exterior information detection unit 12030.

The audio/image output unit 12052 transmits an output signal of at least one of audio and an image to an output device capable of visually or audibly notifying an occupant of a vehicle or the outside of the vehicle of information. In the example illustrated in FIG. 13, an audio speaker 12061, a display unit 12062, and an instrument panel 12063 are illustrated as output devices. The display unit 12062 may include, for example, at least one of an on-board display and a heads-up display.

Figure 14:
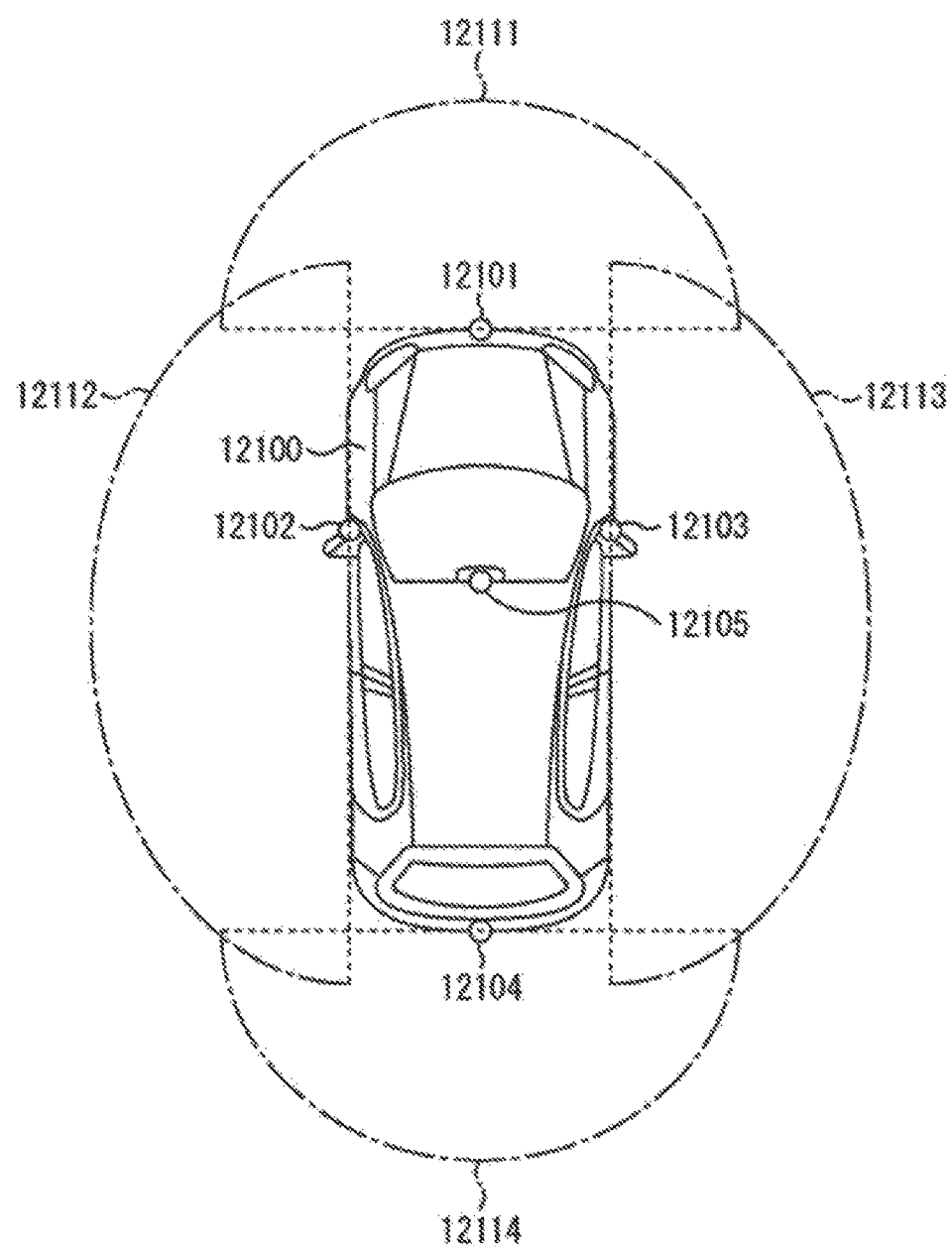
FIG. 14 is a diagram showing an example of an installation position of an imaging unit.

FIG. 14 is a diagram showing an example of positions at which the imaging unit 12031 is installed. In FIG. 14, imaging units 12101, 12102, 12103, 12104, and 12105 are included as the imaging unit 12031.

The imaging units 12101, 12102, 12103, 12104, and 12105 may be provided at positions such as a front nose, side-view mirrors, a rear bumper, a back door, and an upper part of a windshield in a vehicle interior of the vehicle 12100, for example. The imaging unit 12101 provided in the front nose and the imaging unit 12105 provided in the upper portion of the front glass inside the vehicle mainly acquire images on the front side of the vehicle 12100. The imaging units 12102 and 12103 provided in the side mirrors mainly acquire images on the lateral sides of the vehicle 12100. The imaging unit 12104 provided in the rear bumper or the backdoors mainly acquires images on the rear side of the vehicle 12100. The imaging unit 12105 included in the upper portion of the front glass inside the vehicle is mainly used to detect front vehicles or pedestrians, obstacles, traffic signals, traffic signs, lanes, and the like.

FIG. 14 shows an example of imaging ranges of the imaging units 12101 to 12104 by alternate long and short dash lines. An imaging range 12111 indicates an imaging range of the imaging unit 12101 provided at the front nose, imaging ranges 12112 and 12113 respectively indicate the imaging ranges of the imaging units 12102 and 12103 provided at the side-view mirrors, and an imaging range 12114 indicates the imaging range of the imaging unit 12104 provided at the rear bumper or the back door. For example, a bird's-eye view image of the vehicle 12100 as viewed from above can be obtained by superimposition of image data captured by the imaging units 12101 to 12104.

At least one of the imaging units 12101 to 12104 may have a function for obtaining distance information. For example, at least one of the imaging units 12101 to 12104 may be a stereo camera constituted by a plurality of imaging elements or may be an imaging element having pixels for phase difference detection.

For example, the microcomputer 12051 can extract a three-dimensional object traveling at a predetermined speed (for example, 0 km/h or more) in substantially the same direction as that of the vehicle 12100 which is particularly a closest three-dimensional object on a travel road of the vehicle 12100 as a front vehicle by obtaining a distance from each three-dimensional object within the imaging ranges 12111 to 12114 and a temporal change of the distance (a relative speed to the vehicle 12100) based on the distance information obtained from the imaging units 12101 to 12104. Further, the microcomputer 12051 can set an inter-vehicle distance which is guaranteed in advance before a front vehicle and perform automated brake control (also including following stop control) or automated acceleration control (also including following start control). In this manner, it is possible to perform cooperative control for the purpose of, for example, autonomous driving in which the vehicle autonomously travels without requiring the driver to perform operations.

For example, the microcomputer 12051 can classify and extract three-dimensional object data regarding three-dimensional objects into two-wheeled vehicles, ordinary vehicles, large vehicles, pedestrians, and other three-dimensional objects such as utility poles on the basis of distance information obtained from the imaging units 12101 to 12104 and use the three-dimensional object data for automatic avoidance of obstacles. For example, the microcomputer 12051 identifies obstacles in the vicinity of the vehicle 12100 into obstacles that can be visually recognized by the driver of the vehicle 12100 and obstacles that are difficult to visually recognize. Then, the microcomputer 12051 can determine a risk of collision indicating the degree of risk of collision with each obstacle, and can perform driving assistance for collision avoidance by outputting a warning to a driver through the audio speaker 12061 or the display unit 12062 and performing forced deceleration or avoidance steering through the drive system control unit 12010 when the risk of collision has a value equal to or greater than a set value and there is a possibility of collision.

At least one of the imaging units 12101 to 12104 may be an infrared camera that detects infrared light. For example, the microcomputer 12051 can recognize a pedestrian by determining whether or not a pedestrian is present in images captured by the imaging units 12101 to 12104. Such recognition of a pedestrian is performed by, for example, a procedure of extracting a feature point in captured images of the imaging units 12101 to 12104 serving as infrared cameras, and a procedure of performing pattern matching processing on a series of feature points indicating the contour of an object to determine whether or not the object is a pedestrian. When the microcomputer 12051 determines that a pedestrian is present in the captured images of the imaging units 12101 to 12104 and recognizes the pedestrian, the audio/image output unit 12052 controls the display unit 12062 such that a square contour line for emphasis is superimposed on the recognized pedestrian and is displayed. In addition, the audio/image output unit 12052 may control the display unit 12062 so that an icon or the like indicating a pedestrian is displayed at a desired position.

An example of the vehicle control system to which the technology according to the present disclosure is applied has been described above. The technology according to the present disclosure can be applied to the imaging unit 12031 and the like in the above-described configuration. Since it is possible to miniaturize the imaging unit 12031 by applying the technology according to the present disclosure to the imaging unit 12031 or the like, the interior or exterior of the vehicle 12100 can be easily designed. Further, since it is possible to acquire a clear image with reduced noise by applying the technology according to the present disclosure to the imaging unit 12031 or the like, a driver can be provided with a more easily visible captured image. Accordingly, it is possible to reduce driver fatigue.

Example of Application to Endoscopic Operation System

The technology according to the present disclosure (the present technology) can be applied to various products. For example, the technology according to the present disclosure may be applied to an endoscopic operation system.

Figure 15:
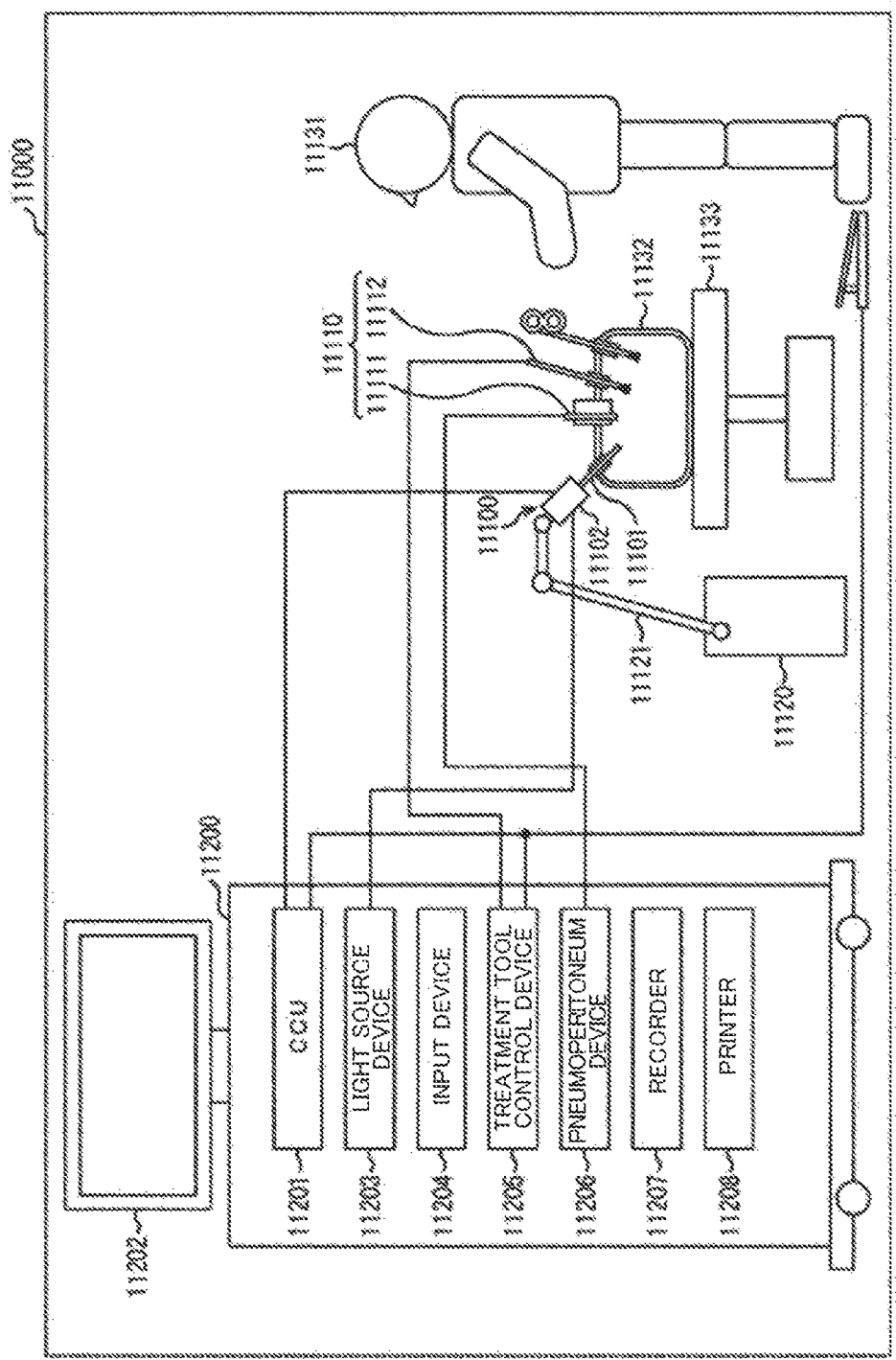
FIG. 15 is a diagram showing an example of a schematic configuration of an endoscopic operation system to which the technology according to the present disclosure (the present technology) can be applied.

FIG. 15 is a diagram showing an example of a schematic configuration of an endoscopic operation system to which the technology according to the present disclosure (the present technology) can be applied.

FIG. 15 shows a state where an operator (doctor) 11131 is performing a surgical operation on a patient 11132 on a patient bed 11133 by using the endoscopic operation system 11000. As illustrated, the endoscopic operation system 11000 includes an endoscope 11100, other surgical instruments 11110 such as a pneumoperitoneum tube 11111 and an energized treatment tool 11112, a support arm device 11120 that supports the endoscope 11100, and a cart 11200 equipped with various devices for endoscopic operation.

The endoscope 11100 includes a lens barrel 11101 of which a region having a predetermined length from a distal end is inserted into a body cavity of the patient 11132, and a camera head 11102 connected to a base end of the lens barrel 11101. Although the endoscope 11100 configured as a so-called rigid mirror having the rigid lens barrel 11101 is illustrated in the illustrated example, the endoscope 11100 may be configured as a so-called flexible mirror having a flexible lens barrel.

An opening in which an objective lens is fitted is provided at a distal end of the lens barrel 11101. A light source device 11203 is connected to the endoscope 11100, and light generated by the light source device 11203 is guided to the distal end of the lens barrel by a light guide extending inside the lens barrel 11101 and is radiated toward the observation target in the body cavity of the patient 11132 via the objective lens. The endoscope 11100 may be a direct-viewing endoscope or may be a perspective endoscope or a side-viewing endoscope.

An optical system and an imaging element are provided inside the camera head 11102, and the reflected light (observation light) from the observation target is condensed on the imaging element by the optical system. The observation light is photoelectrically converted by the imaging element, and an electrical signal corresponding to the observation light, that is, an image signal corresponding to an observation image is generated. The image signal is transmitted as RAW data to a camera control unit (CCU) 11201.

The CCU 11201 includes a central processing unit (CPU), a graphics processing unit (GPU), and the like, and integrally controls operations of the endoscope 11100 and a display device 11202. Further, the CCU 11201 receives the image signal from the camera head 11102 and performs various image processing such as development processing (demosaic processing) on the image signal for displaying an image based on the image signal.

The display device 11202 displays an image based on an image signal that has been subjected to image processing by the CCU 11201 under the control of the CCU 11201.

The light source device 11203 includes a light source such as a light emitting diode (LED) and supplies the endoscope 11100 with radiation light for imaging an operation site or the like.

An input device 11204 is an input interface for the endoscopic operation system 11000. The user can input various types of information or instructions to the endoscopic operation system 11000 via the input device 11204. For example, the user inputs an instruction to change imaging conditions (a type of irradiation light, a magnification, a focal length, or the like) of the endoscope 11100.

A treatment tool control device 11205 controls drive of the energized treatment tool 11112 for cauterizing or incising tissue, sealing a blood vessel, or the like. A pneumoperitoneum device 11206 sends gas into the body cavity through a pneumoperitoneum tube 11111 in order to inflate the body cavity of the patient 11132 for the purpose of securing a visual field for the endoscope 11100 and a working space for the operator. A recorder 11207 is a device capable of recording various information regarding operation. A printer 11208 is a device that can print various types of information regarding operation in various formats such as text, images, or graphs.

The light source device 11203 that supplies the endoscope 11100 with the radiation light for imaging the operation site can be configured of, for example, an LED, a laser light source, or a white light source configured of a combination thereof. When a white light source is formed by a combination of RGB laser light sources, it is possible to control an output intensity and an output timing of each color (each wavelength) with high accuracy and thus, the light source device 11203 adjusts white balance of the captured image. Further, in this case, the observation target is time-divisionally irradiated with laser light from the respective RGB laser light sources, and driving of the imaging element of the camera head 11102 is controlled in synchronization with the irradiation timing, such that images corresponding to respective RGB can be captured in a time division manner. According to this method, it is possible to obtain a color image without providing a color filter to the imaging element.

Further, the driving of the light source device 11203 may be controlled to change the intensity of the output light at predetermined time intervals. It is possible to acquire images in a time-division manner by controlling the driving of the imaging element of the camera head 11102 in synchronization with a timing at which the intensity of the light is changed, and it is possible to generate a high dynamic range image without so-called blackout and whiteout by combining the images.

Further, the light source device 11203 may be configured to be able to supply light having a predetermined wavelength band corresponding to special light observation. In the special light observation, for example, so-called narrow band imaging in which a predetermined tissue such as a blood vessel of a mucosal surface layer is imaged with high contrast through radiation of light in a narrower band than irradiation light (that is, white light) at the time of normal observation using a dependence of absorption of light in a body tissue on a wavelength is performed. Alternatively, in the special light observation, fluorescence observation in which an image is obtained using fluorescence generated through excitation light irradiation may be performed. In the fluorescence observation, it is possible to irradiate the body tissue with excitation light and observe the fluorescence from the body tissue (autofluorescence observation), to obtain a fluorescence image by locally injecting a reagent such as indocyanine green (ICG) into the body tissue and irradiating the body tissue with excitation light corresponding to the fluorescence wavelength of the reagent, or the like. The light source device 11203 may be configured to be able to supply the narrow band light and/or the excitation light corresponding to such special light observation.

Figure 16:
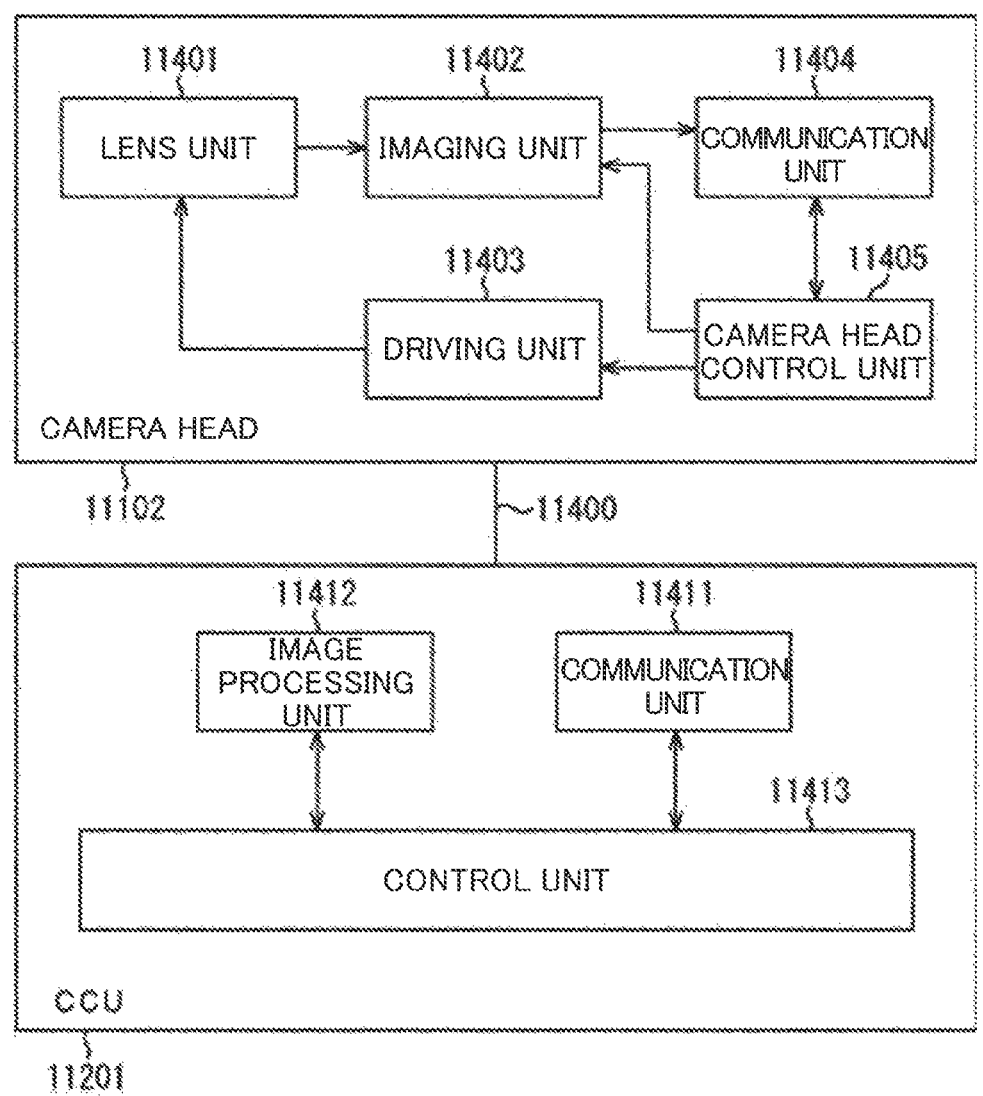
FIG. 16 is a block diagram showing an example of a functional configuration of a camera head and a CCU shown in FIG. 13.

FIG. 16 is a block diagram showing an example of a functional configuration of the camera head 11102 and CCU 11201 shown in FIG. 15.

The camera head 11102 includes a lens unit 11401, an imaging unit 11402, a driving unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other via a transmission cable 11400.

The lens unit 11401 is an optical system provided at a portion for connection to the lens barrel 11101. The observation light taken in from the distal end of the lens barrel 11101 is guided to the camera head 11102 and incident on the lens unit 11401. The lens unit 11401 is configured in combination of a plurality of lenses including a zoom lens and a focus lens.

The number of imaging elements constituting the imaging unit 11402 may be one (so-called single-plate type) or plural (so-called multi-plate type). When the imaging unit 11402 is configured as a multi-plate type, image signals corresponding to R, G, and B, for example, may be generated by the respective imaging elements and may be combined to obtain a color image. Alternatively, the imaging unit 11402 may be configured to include a pair of imaging elements for respectively acquiring right-eye image signals and left-eye image signals corresponding to 3D (dimensional) display. By performing the 3D display, the operator 11131 can understand a depth of a living tissue in the operation site more accurately. Also, in a case in which the imaging unit 11402 is configured as the multi-plate type, a plurality of lens units 11401 may be provided corresponding to each imaging element.

Further, the imaging unit 11402 may not be necessarily provided in the camera head 11102. For example, the imaging unit 11402 may be provided immediately after the objective lens inside the lens barrel 11101.

The driving unit 11403 includes an actuator, and moves the zoom lens and the focus lens of the lens unit 11401 by a predetermined distance along an optical axis under the control of the camera head control unit 11405. Accordingly, the magnification and focus of the image captured by the imaging unit 11402 can be adjusted appropriately.

The communication unit 11404 includes a communication device for transmitting or receiving various types of information to or from the CCU 11201. The communication unit 11404 transmits an image signal obtained from the imaging unit 11402 to the CCU 11201 through the transmission cable 11400 as RAW data.

The communication unit 11404 also receives a control signal for controlling driving of the camera head 11102 from the CCU 11201 and supplies the control signal to the camera head control unit 11405. The control signal includes, for example, information on the imaging conditions such as information indicating that the frame rate of the captured image is designated, information indicating that the exposure value at the time of imaging is designated, and/or information indicating that the magnification and the focus of the captured image are designated.

The imaging conditions such as the frame rate, the exposure value, the magnification, and the focus may be appropriately designated by the user, or may be automatically set by the control unit 11413 of the CCU 11201 on the basis of the acquired image signal. In the latter case, the so-called AE (auto exposure) function, AF (auto focus) function, and AWB (auto white balance) function are provided to the endoscope 11100.

The camera head control unit 11405 controls the driving of the camera head 11102 on the basis of the control signal from the CCU 11201 received via the communication unit 11404.

The communication unit 11411 includes a communication device for transmitting and receiving various types of information to and from the camera head 11102.

The communication unit 11411 receives an image signal transmitted from the camera head 11102 via the transmission cable 11400.

In addition, the communication unit 11411 transmits a control signal for controlling the driving of the camera head 11102 to the camera head 11102. The image signal or the control signal can be transmitted through electric communication, optical communication, or the like.

The image processing unit 11412 performs various image processing on the image signal that is the RAW data transmitted from the camera head 11102.

The control unit 11413 performs various controls regarding imaging of the operation site or the like using the endoscope 11100 and a display of a captured image obtained by imaging the operation site or the like. For example, the control unit 11413 generates the control signal for controlling the driving of the camera head 11102.

Further, the control unit 11413 causes the display device 11202 to display the captured image obtained by imaging the operation site or the like on the basis of the image signal subjected to the image processing by the image processing unit 11412. In this case, the control unit 11413 may recognize various objects in the captured image using various image recognition technologies. For example, the control unit 11413 can detect shapes and colors of edges of an object included in the captured image, thereby recognizing surgical instruments such as forceps, a specific living body part, bleeding, mist at the time of using the energized treatment tool 11112, and the like. The control unit 11413 may use the recognition results to superimpose and display various types of operation support information on the image of the operation site when the captured image is displayed on the display device 11202. By displaying the operation support information in a superimposed manner and presenting it to the operator 11131, a burden on the operator 11131 can be reduced, and the operator 11131 can reliably proceed with the operation.

The transmission cable 11400 that connects the camera head 11102 to the CCU 11201 is an electrical signal cable compatible with communication of an electrical signal, an optical fiber compatible with optical communication, or a composite cable thereof.

Here, in the illustrated example, wired communication is performed using the transmission cable 11400, but the communication between the camera head 11102 and the CCU 11201 may be performed wirelessly.

The example of the endoscopic operation system to which the technology according to the present disclosure can be applied has been described above. The technology according to the present disclosure can be applied to, for example, the imaging unit 11402 of the camera head 11102, or the like in the configurations described above. By applying the technology according to the present disclosure to the camera head 11102, the camera head 11102 and the like can be miniaturized, and thus the endoscopic operation system 11000 can be miniaturized. Further, by applying the technology according to the present disclosure to the camera head 11102 or the like, it is possible to acquire a clear image with reduced noise, and thus it is possible to provide an operator with a more easily visible captured image. Accordingly, it is possible to reduce the fatigue of the operator.

Here, although the endoscopic operation system has been described as an example, the technology according to the present disclosure may be applied to other, for example, a microscopic operation system.

Example of Application to Whole Slide Imaging (WSI) System

The technology according to the present disclosure can be applied to various products. For example, the technology according to the present disclosure may be applied to a pathological diagnostic system or a support system thereof (hereinafter referred to as a diagnosis support system) in which a doctor or the like observes cells or tissues collected from a patient to diagnose a lesion. This diagnosis support system may be a whole slide imaging (WSI) system that diagnoses lesions or supports the diagnosis on the basis of images acquired using digital pathology technology.

Figure 17:
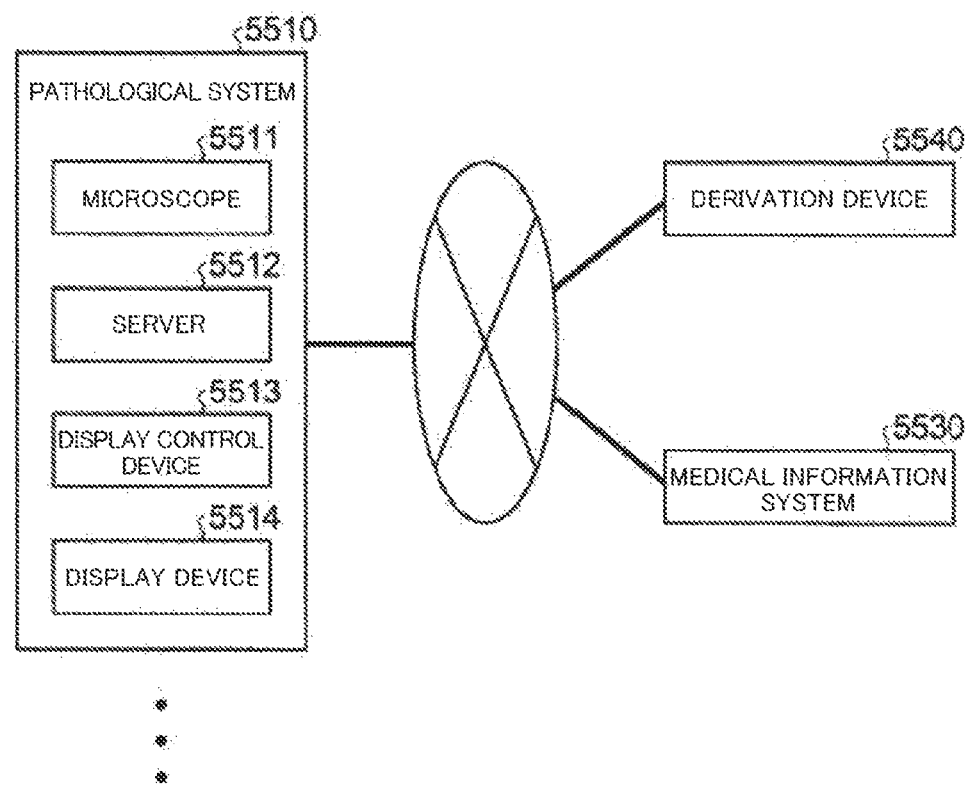
FIG. 17 is a diagram showing an example of a schematic configuration of a diagnosis support system to which the technology according to the present disclosure is applied.

FIG. 17 is a diagram showing an example of a schematic configuration of a diagnosis support system 5500 to which the technology according to the present disclosure is applied. As shown in FIG. 17, the diagnosis support system 5500 includes one or more pathological systems 5510. Further, it may include a medical information system 5530 and a derivation device 5540.

Each of the one or more pathological systems 5510 is a system mainly used by pathologists and is introduced into, for example, laboratories and hospitals. The pathological systems 5510 may be introduced into different hospitals and are connected to the medical information system 5530 and the derivation device 5540 via various networks such as a wide area network (WAN) (including the Internet), a local area network (LAN), a public line network, and a mobile communication network.

Each pathological system 5510 includes a microscope 5511, a server 5512, a display control device 5513, and a display device 5514.

The microscope 5511 has a function of an optical microscope and images an observation target contained in a glass slide to acquire a pathological image which is a digital image. The observation target is, for example, tissues or cells collected from a patient and may be a piece of flesh, saliva, blood, or the like of an organ.

The server 5512 stores and saves the pathological image acquired by the microscope 5511 in a storage unit which is not illustrated. Further, when the server 5512 receives a viewing request from the display control device 5513, the server 5512 searches the storage unit which is not illustrated for a pathological image and sends the searched pathological image to the display control device 5513.

The display control device 5513 sends a viewing request for a pathological image received from a user to the server 5512. In addition, the display control device 5513 causes the display device 5514 using a liquid crystal display, electroluminescence (EL), a cathode ray tube (CRT), or the like to display a pathological image received from the server 5512. The display device 5514 may be compatible with 4K or 8K, and is not limited to one and may be a plurality of display devices.

Here, when the observation target is a solid substance such as a piece of flesh of an organ, the observation target may be, for example, a stained thin section. The thin section may be prepared, for example, by slicing a block piece cut out from a sample such as an organ. Further, the block pieces may be fixed with paraffin or the like at the time of slicing.

Various types of staining such as general staining showing the morphology of tissues such as hematoxylin-eosin (HE) staining and immunostaining showing an immune state of tissues such as immunohistochemistry (IHC) staining may be applied for staining thin sections. At that time, one thin section may be stained with a plurality of different reagents, or two or more thin sections (also referred to as adjacent thin sections) continuously cut out from the same block piece may be stained with different reagents.

The microscope 5511 may include a low-resolution imaging unit for imaging at a low resolution and a high-resolution imaging unit for imaging at a high resolution. The low-resolution imaging unit and the high-resolution imaging unit may have different optical systems or the same optical system. In the case of the same optical system, the resolution of the microscope 5511 may be changed depending on imaging targets.

The glass slide containing the observation target is placed on a stage located within the angle of view of the microscope 5511. The microscope 5511 acquires a whole image within the angle of view using the low-resolution imaging unit first, and identifies an area of the observation target from the acquired whole image. Subsequently, the microscope 5511 divides the area where the observation target is present into a plurality of divided regions of a predetermined size and sequentially images the divided regions by the high-resolution imaging unit to acquire a high-resolution image of each divided region. In switching the divided regions that are targets, the stage may be moved, the imaging optical system may be moved, or both thereof may be moved. Further, each divided region may overlap with an adjacent divided region in order to prevent occurrence of an imaging omission region due to an unintended slip of the glass slide. Further, the whole image may include identification information for associating the whole image with the patient. This identification information may be, for example, a character string, a QR code (registered trademark), or the like.

The high-resolution images acquired by the microscope 5511 are input to the server 5512. The server 5512 divides each high-resolution image into smaller-sized partial images (hereinafter referred to as tile images). For example, the server 5512 divides one high-resolution image into a total of 100 tile images of 10×10 in the vertical and horizontal directions. At that time, if adjacent divided regions overlap, the server 5512 may perform stitching processing on adjacent high-resolution images using a technique such as template matching. In such a case, the server 5512 may generate tile images by dividing the whole high-resolution image bonded by stitching processing. However, the tile images may be generated from the high-resolution image before stitching processing.

Further, the server 5512 can generate tile images of a smaller size by further dividing the tile image. Generation of such tile images may be repeated until a tile image having a size set in a minimum unit is generated.

When tile images in the minimum unit are generated in this manner, the server 5512 executes tile synthesis processing for generating one tile image by synthesizing a predetermined number of adjacent tile images on all the tile images. This tile synthesis processing can be repeated until one tile image is finally generated. By such processing, a tile image group having a pyramid structure in which each layer is composed of one or more tile images is generated. In this pyramid structure, the tile images of one layer and the tile images of a different layer have the same number of pixels, but their resolutions are different. For example, when a total of four tile images of 2×2 are synthesized to generate one tile image of the upper layer, the resolution of the tile image of the upper layer is ½ times the resolution of the tile images of the lower layer used for synthesis.

By constructing a tile image group having such a pyramid structure, it is possible to switch the level of detail of the observation target displayed on the display device depending on a hierarchy to which a tile image that is a display target belongs. For example, a narrow area of an observation target can be displayed in detail when tile image of the lowermost layer is used, and a wider area of an observation target can be displayed coarser when a tile image of an upper layer is used.

The generated tile image group in the pyramid structure is stored in a storage unit which is not illustrated along with identification information (referred to as tile identification information) that can uniquely identify each tile image, for example. When the server 5512 receives a request for acquiring a tile image including tile identification information from another device (for example, the display control device 5513 or the derivation device 5540), the server 5512 transmits the tile image corresponding to the tile identification information to the other device.

Meanwhile, tile images, which are pathological images, may be generated for each imaging condition such as a focal length and staining conditions. When tile images are generated for each imaging condition, a specific pathological image and another pathological image corresponding to an imaging condition different from a specific imaging condition, which is another pathological image in the same region as the specific pathological image, may be displayed side by side. The specific imaging condition may be designated by a viewer. Further, when a plurality of imaging conditions are designated for the viewer, pathological images of the same region corresponding to each imaging condition may be displayed side by side.

Further, the server 5512 may store the tile image group in the pyramid structure in a storage device other than the server 5512, for example, a cloud server. Further, a part or all of tile image generation processing as described above may be executed by a cloud server or the like.

The display control device 5513 extracts a desired tile image from the tile image group in the pyramid structure in response to an input operation from the user and outputs the desired tile image to the display device 5514. By such processing, the user can obtain the feeling of observing the observation target while changing observation magnification. That is, the display control device 5513 serves as a virtual microscope. The virtual observation magnification here actually corresponds to the resolution.

Any method may be used as a method for capturing a high-resolution image. Divided regions may be imaged by repeatedly stopping and moving the stage to acquire a high-resolution image, or the divided regions may be imaged by moving the stage at a predetermined speed to acquire a high-resolution image on strips. In addition, processing of generating tile images from a high-resolution image is not an essential configuration, and an image having resolution changing in stages may be generated by gradually changing the resolution of a whole high-resolution image bonded by stitching. Even in this case, it is possible to gradually present, to the user, a low-resolution image in a wide area to a high-resolution image in a narrow area.

The medical information system 5530 is a so-called electronic medical record system and stores information related to diagnosis such as patient identification information, patient disease information, test information and image information used for diagnosis, diagnostic results, and prescription drugs. For example, a pathological image obtained by imaging an observation target of a certain patient can be once saved via the server 5512 and then displayed on the display device 5514 by the display control device 5513. Pathologists using the pathological system 5510 perform pathological diagnosis on the basis of pathological images displayed on the display device 5514. Results of pathological diagnosis performed by pathologists are stored in the medical information system 5530.

The derivation device 5540 can perform analysis on pathological images. A learning model created by machine learning can be used for this analysis. The derivation device 5540 may derive a result of classification of a specific area, a tissue identification result, or the like as an analysis result. Further, the derivation device 5540 may derive identification results such as cell information, a number, a position, and luminance information, scoring information thereon, and the like. Such information derived by the derivation device 5540 may be displayed on the display device 5514 of the pathological system 5510 as diagnosis support information.

The derivation device 5540 may be a server system composed of one or more servers (including a cloud server) and the like. Further, the derivation device 5540 may be a component incorporated in, for example, the display control device 5513 or the server 5512 in the pathological system 5510. That is, various types of analysis on pathological images may be performed in the pathological system 5510.

The technology according to the present disclosure can be suitably applied to, for example, the microscope 5511 among the above-described components. Specifically, the technology according to the present disclosure can be applied to the low-resolution imaging unit and/or the high-resolution imaging unit in the microscope 5511. By applying the technology according to the present disclosure to the low-resolution imaging unit and/or the high-resolution imaging unit, the low-resolution imaging unit and/or the high-resolution imaging unit can be miniaturized and the microscope 5511 can be miniaturized. Accordingly, the microscope 5511 can be easily transported, which makes it possible to facilitate system introduction, system recombination, and the like. Furthermore, by applying the technology according to the present disclosure to the low-resolution imaging unit and/or the high-resolution imaging unit, part or all of processing from acquisition of a pathological image to analysis of the pathological image can be performed on the fly in the microscope 5511, and thus it is possible to output diagnosis support information more rapidly and accurately.

The configuration described above can be applied not only to the diagnosis support system but also to a general biological microscope such as a confocal microscope, a fluorescence microscope, and a video microscope. Here, the observation object may be a biological sample such as cultured cells, a fertilized egg, or a sperm, a biomaterial such as a cell sheet or a three-dimensional cell tissue, or a living body such as a zebrafish or a mouse. Further, the observation object is not limited to the glass slide, and can be observed in a state of being stored in a well plate, a petri dish, or the like.

Further, a moving image may be generated from still images of an observation object acquired using a microscope. For example, a moving image may be generated from still images continuously captured for a predetermined period, or an image sequence may be generated from still images captured at predetermined intervals. By generating a moving image from still images in this manner, it is possible to analyze dynamic characteristics of an observation object, such as movement such as beat, elongation, and migration of cancer cells, nerve cells, myocardial tissues, sperms, and the like, and a division process of cultured cells and fertilized eggs, using machine learning.

Meanwhile, the present technology can take the following configurations.

(1) A light receiving device including an imaging unit that photoelectrically converts light received in a plurality of pixels to acquire an analog image signal, a conversion unit that converts the analog image signal acquired by the imaging unit into digital image data, and a data processing unit that executes data processing on the digital image data, and reduces a load of the data processing in a period in which the conversion unit executes conversion as compared to a period in which the conversion unit does not execute conversion.

(2) The light receiving device according to (1), further including a clock generation unit that generates a clock signal having a predetermined frequency, and a clock control unit that receives the clock signal having the predetermined frequency from the clock generation unit, outputs the clock signal having the predetermined frequency to the data processing unit in a period in which the conversion unit does not execute conversion processing, and outputs a clock signal controlled to have a frequency lower than the predetermined frequency to the data processing unit in a period in which the conversion unit executes conversion processing, wherein the data processing unit executes the data processing on the basis of the clock signal output by the clock control unit.

(3) The light receiving device according to (2), further including an imaging control unit that controls a timing at which the imaging unit performs imaging, and a period designation unit that designates a period in which the load of data processing is reduced on the basis of the timing controlled by the imaging control unit.

(4) The light receiving device according to (3), wherein the clock control unit controls the clock signal to have a frequency lower than the predetermined frequency in the period designated by the period designation unit.

(5) The light receiving device according to (3) or (4), wherein the imaging control unit outputs a synchronization signal to the period designation unit at an imaging timing, and the period designation unit designates a period in which the clock control unit controls the clock signal to be lower than the predetermined frequency on the basis of the synchronization signal.

(6) The light receiving device according to (5), wherein the imaging control unit outputs a first synchronization signal that is a synchronization signal for an imaging timing of an image to be imaged in a first direction and a second synchronization signal that is a synchronization signal for an imaging timing of the image to be imaged in a second direction intersecting the first direction to the period designation unit.

(7) The light receiving device according to (6), wherein the period designation unit designates a first predetermined period based on the first synchronization signal as a period in which the clock control unit outputs the clock signal having the predetermined frequency, and the clock control unit outputs the clock signal having the predetermined frequency generated by the clock generation unit in the first predetermined period on the basis of output of the period designation unit.

(8) The light receiving device according to (6) or (7), wherein the period designation unit designates a second predetermined period based on the second synchronization signal as a period in which the clock control unit outputs a clock signal having a frequency lower than the predetermined frequency, and the clock control unit controls the clock signal generated by the clock generation unit to be a clock signal having a frequency lower than the predetermined frequency and outputs the clock signal in the second predetermined period on the basis of output of the period designation unit.

(9) The light receiving device according to any one of (2) to (8), wherein the clock control unit controls the clock signal not to be output in the period in which the conversion unit executes conversion.

(10) The light receiving device according to any one of (2) to (9), wherein the data processing unit includes an image processing unit that executes image processing of the digital image data on the basis of the clock signal output by the clock control unit.

(11) The light receiving device according to any one of (1) to (10), wherein the data processing unit includes a signal processing unit that executes processing by a trained neural network model.

(12) The light receiving device according to any one of (1) to (11), wherein the imaging unit, the conversion unit, and the data processing unit are formed on the same substrate.

(13) The light receiving device according to any one of (1) to (11), including a first substrate on which the imaging unit is formed, and a second substrate on which the conversion unit and the data processing unit are formed, which is laminated on the first substrate.

(14) The light receiving device according to (13), wherein the first substrate and the second substrate are bonded by any of a Chip on Chip (CoC) method, a Chip on Wafer (CoW) method, and a Wafer on Wafer (WoW) method.

(15) An electronic apparatus including a light receiving device that outputs captured image data, and
a processor that performs predetermined signal processing on the image data,
wherein the light receiving device includes
an imaging unit that photoelectrically converts light received in a plurality of pixels to acquire an analog image signal,
a conversion unit that converts the analog image signal acquired by the imaging unit into digital image data,
a clock generation unit that generates a clock signal having a predetermined frequency,
a clock control unit that receives the clock signal having the predetermined frequency from the clock generation unit, outputs the clock signal having the predetermined frequency in a period in which the conversion unit does not execute conversion processing, and outputs a clock signal controlled to have a frequency lower than the predetermined frequency in a period in which the conversion unit executes conversion processing, and
a data processing unit that executes data processing on the digital image data on the basis of the clock signal output by the clock control unit,
wherein output of the data processing unit is input to the processor.

(16) The electronic apparatus according to (15), wherein the data processing unit includes an image processing unit that executes image processing of the digital image data on the basis of the clock signal output by the clock control unit.

(17) The electronic apparatus according to (15) or (16), wherein the data processing unit includes a signal processing unit that executes processing by a trained neural network model.

(18) The electronic apparatus according to any one of (15) to (17), arbitrary including any of the features (3) to (9).

(19) The electronic apparatus according to any one of (15) to (18), having any of the configurations (12) to (14).

(20) A light receiving method including photoelectrically converting, by a light receiving unit, light received in a plurality of pixels to acquire an analog image signal,
converting, by a conversion unit, the analog image signal acquired by an imaging unit into digital image data, and
executing, by a data processing unit, data processing on the digital image data such that a load of the data processing in a period in which the conversion unit executes conversion is reduced as compared to a period in which the conversion unit does not execute conversion.

Aspects of the present disclosure are not limited to the individual embodiments described above and also include various modifications that can be conceived by those skilled in the art, and the effects of the present disclosure are not limited to the above description. That is, various additions, changes and partial deletions are possible without departing from the conceptual idea and purpose of the present disclosure which can be derived from the contents specified in the claims and their equivalents.

Further, in addition to the above-described application to mobile objects and medical treatment, the present disclosure can also be applied to an apparatus that detects movement and performs recognition processing in the light receiving device 1, such as a monitoring camera.

REFERENCE SIGNS LIST

1 Light receiving device
10 Imaging unit
100 Pixel array
11 Conversion unit
12 Data processing unit
13 ISP
14 DSP
15 Output I/F control unit
16 Imaging control unit
17 Clock generation unit
18 Clock control unit
19 Period designation unit
20 Memory

The invention claimed is:
1. A light receiving device, comprising:
an imaging unit configured to:
photoelectrically convert light received in a plurality of pixels; and
acquire an analog image signal based on the photoelectric conversion;
a conversion unit configured to convert the acquired analog image signal into digital image data; and
a data processing unit configured to:
execute data processing operation on the digital image data; and
reduce load of the data processing operation in a first period compared to a second period, wherein the first period is a period in which the conversion unit executes the conversion, and the second period is a period in which the conversion unit does not execute the conversion.

2. The light receiving device according to claim 1, further comprising:

a clock generation unit configured to generate a first clock signal having a specific frequency; and a clock control unit configured to:
receive the first clock signal having the specific frequency;
output the first clock signal having the specific frequency to the data processing unit in the second period; and
output a second clock signal having a frequency lower than the specific frequency to at least a part of the data processing unit in the first period,
wherein the data processing unit is further configured to execute the data processing operation based on one of the first clock signal or the second clock signal.

3. The light receiving device according to claim 2, wherein the imaging unit is further configured to perform imaging, and the light receiving device further comprises:
an imaging control unit configured to control a timing at which the imaging is performed; and
a period designation unit configured to designate a third period in which the load of the data processing operation is reduced based on the timing.

4. The light receiving device according to claim 3, wherein the clock control unit is further configured to control the second clock signal to have the frequency lower than the specific frequency in the designated third period.

5. The light receiving device according to claim 3, wherein the imaging control unit is further configured to output a synchronization signal to the period designation unit at the timing of the imaging, and the period designation unit is further configured to designate a fourth period, in which the second clock signal is controlled to have the frequency lower than the specific frequency, based on the synchronization signal.

6. The light receiving device according to claim 5, wherein the imaging control unit is further configured to:

output a first synchronization signal to the period designation unit, wherein the first synchronization signal is a signal for a first imaging timing of an image that is imaged in a first direction; and output a second synchronization signal to the period designation unit, wherein the second synchronization signal is for a second imaging timing of an image that is imaged in a second direction, and the second direction intersects the first direction.

7. The light receiving device according to claim 6, wherein the period designation unit is further configured to designate, based on the first synchronization signal, first specific period in which the clock control unit outputs the first clock signal having the specific frequency, and the clock control unit is further configured to output the first clock signal having the specific frequency in the first specific period based on output of the period designation unit.

8. The light receiving device according to claim 6, wherein the period designation unit is further configured to designate, based on the second synchronization signal, a second specific period in which the clock control unit outputs the second clock signal having the frequency lower than the specific frequency, and the clock control unit is further configured to:
control the second clock signal to have the frequency lower than the specific frequency; and
output the second clock signal in the second specific period based on output of the period designation unit.

9. The light receiving device according to claim 2, wherein the clock control unit is further configured to stop output of the first clock signal in the first period.

10. The light receiving device according to claim 2, wherein the data processing unit includes an image processing unit configured to execute an image processing operation of the digital image data based on the second clock signal.

11. The light receiving device according to claim 1, wherein the data processing unit includes a signal processing unit, and the signal processing unit is configured to execute a processing operation by a trained neural network model.

12. The light receiving device according to claim 1, wherein the imaging unit, the conversion unit, and the data processing unit are on a substrate.

13. The light receiving device according to claim 1, further comprising:

a first substrate, wherein the imaging unit is on the first substrate; and a second substrate, wherein
the conversion unit and the data processing unit are on the second substrate, and
the second substrate is on the first substrate.

14. The light receiving device according to claim 13, wherein the first substrate and the second substrate are bonded by one of a Chip on Chip (CoC) method, a Chip on Wafer (CoW) method, or a Wafer on Wafer (WoW) method.

15. An electronic apparatus, comprising:

a light receiving device configured to output image data; and a processor configured to perform a specific signal processing operation on the image data, wherein the light receiving device includes:
an imaging unit configured to:
photoelectrically convert light received in a plurality of pixels; and
acquire an analog image signal based on the photoelectric conversion;
a conversion unit configured to convert the acquired analog image signal into digital image data;
a clock generation unit configured to generate a first clock signal having a specific frequency;
a clock control unit configured to:
receive the first clock signal having the specific frequency;
output the first clock signal having the specific frequency in a first period; and
output a second clock signal having a frequency lower than the specific frequency in a second period; and a data processing unit configured to:
- execute data processing operation on the digital image data based on the second clock signal; and
- reduce a load of the data processing operation in the second period in comparison to the first period, wherein
  - the second period is a period in which the conversion unit executes the conversion,
  - the first period is a period in which the conversion unit does not execute the conversion, and
  - output of the data processing unit is input to the processor.

16. The electronic apparatus according to claim 15, wherein
   the data processing unit includes an image processing unit, and
   the image processing unit is configured to execute an image processing operation of the digital image data based on the second clock signal.

17. The electronic apparatus according to claim 15, wherein
   the data processing unit includes a signal processing unit, and
   the signal processing unit is configured to execute a processing operation by a trained neural network model.

18. A light receiving method, comprising:
   photoelectrically converting, by a light receiving unit, light received in a plurality of pixels; and
   acquiring, by the light receiving unit, an analog image signal based on the photoelectric conversion;
   converting, by a conversion unit, the acquired analog image signal into digital image data;
   executing, by a data processing unit, data processing on the digital image data; and
   reducing a load of the data processing in a first period compared to a second period, wherein
   the first period is a period in which the conversion unit executes the conversion, and
   the second period is a period in which the conversion unit does not execute the conversion.

* * * * *